United States Patent
Schuetz et al.

(10) Patent No.: US 10,799,899 B2
(45) Date of Patent: Oct. 13, 2020

(54) MODULAR DESIGN FOR PRESSURE WASHER SYSTEMS

(71) Applicant: Northern Tool & Equipment Company, Inc., Burnsville, MN (US)

(72) Inventors: John Schuetz, Owatonna, MN (US); Timothy Rancourt, Lakeville, MN (US); Kyle Hecimovich, Lonsdale, MN (US)

(73) Assignee: Northern Tool & Equipment Company, Inc., West Burnsville, MN (US)

( * ) Notice: Subject to any disclaimer, the term of this patent is extended or adjusted under 35 U.S.C. 154(b) by 142 days.

(21) Appl. No.: 15/939,585

(22) Filed: Mar. 29, 2018

(65) Prior Publication Data
US 2019/0299234 A1    Oct. 3, 2019

(51) Int. Cl.
*B08B 3/02* (2006.01)
*B05B 9/043* (2006.01)
*B05B 9/00* (2006.01)
*B60P 3/14* (2006.01)

(52) U.S. Cl.
CPC .............. *B05B 9/043* (2013.01); *B05B 9/007* (2013.01); *B08B 3/026* (2013.01); *B60P 3/14* (2013.01); *B08B 2203/007* (2013.01); *B08B 2203/0241* (2013.01)

(58) Field of Classification Search
CPC . B08B 3/026; B08B 3/028; B08B 2203/0223; B08B 2203/0241; B08B 2203/027; F02B 63/044; F02B 63/045; F02B 63/047; F02B 63/048
See application file for complete search history.

(56) References Cited

U.S. PATENT DOCUMENTS

| 6,092,768 A * | 7/2000 | Larson | B08B 13/00 |
| | | | 248/129 |
| 6,761,135 B1 * | 7/2004 | Becktold | B08B 3/026 |
| | | | 122/396 |
| 2006/0231644 A1 * | 10/2006 | Breedlove | A62C 25/00 |
| | | | 239/398 |

(Continued)

FOREIGN PATENT DOCUMENTS

| AU | 2018202437 | 10/2019 |
| CA | 3000203 | 9/2019 |

(Continued)

OTHER PUBLICATIONS

"Youtube video link: "https://www.youtube.com/watch?v=uTBDUhC5FY4" as dated Feb. 27, 2018."

(Continued)

*Primary Examiner* — Marc Lorenzi
(74) *Attorney, Agent, or Firm* — Naomi Mann; Fafinski Mark & Johnson, P.A.

(57) ABSTRACT

A modular design for a pressure washer system comprises a support frame including a top mounting surface, a first power assembly configured to be mounted to the support frame, and a cage assembly including a cage frame and a cage attached to the cage frame and configured to extend upwardly from the cage frame at least partially surrounding the power assembly, wherein the cage frame is configured to be attached to the support frame.

9 Claims, 14 Drawing Sheets

(56) References Cited

U.S. PATENT DOCUMENTS

| | | | | |
|---|---|---|---|---|
| 2007/0207042 | A1* | 9/2007 | Hahn | B08B 3/026 417/234 |
| 2007/0207043 | A1* | 9/2007 | Hahn | F04B 17/05 417/234 |
| 2010/0192980 | A1* | 8/2010 | Turner | A47L 5/365 134/21 |
| 2011/0081261 | A1* | 4/2011 | Klika | B08B 3/026 417/364 |
| 2012/0124955 | A1* | 5/2012 | Klika | A01D 42/00 56/17.3 |
| 2012/0234616 | A1* | 9/2012 | Jaskowiak | B60K 15/077 180/69.4 |
| 2013/0092745 | A1* | 4/2013 | Karp | B08B 3/026 239/1 |
| 2013/0099492 | A1* | 4/2013 | Hiranuma | F02B 63/044 290/7 |
| 2015/0233311 | A1* | 8/2015 | Repasky | F02D 33/006 123/332 |
| 2019/0009309 | A1* | 1/2019 | Rickey | B05B 9/007 |
| 2019/0299256 | A1* | 10/2019 | Reinhardt | B08B 3/08 |

FOREIGN PATENT DOCUMENTS

| | | |
|---|---|---|
| CL | 20181040 | 9/2018 |
| CL | 20181041 | 9/2018 |
| CL | 20181042 | 9/2018 |
| CL | 20181043 | 9/2018 |
| CL | 201801032 | 9/2018 |
| CL | 201801033 | 9/2018 |
| CL | 201801034 | 9/2018 |
| CL | 2018001044 | 11/2018 |
| MX | 2018004976 | 9/2019 |

OTHER PUBLICATIONS

"Report dated Apr. 20, 2018 for Chilean Patent Application No. 2018-1044."

"Letter by Goytia & Associates regarding Office Action/Notification of Examination Report for Chilean Patent Application No. 2018-01044, said letter dated Aug. 12, 2019."

Letter by Goytia & Associates regarding Office Action and Search Report for Chilean Patent Application No. 2018-01044, dated Jan. 30, 2020.

* cited by examiner

MODULAR DESIGN FOR PRESSURE WASHER SYSTEMS

TECHNICAL FIELD

The present disclosure relates to pressure washer systems. More specifically, the present disclosure relates to a modular design for pressure washer systems that allows different pressure washer systems to be built using a limited number of components and subassemblies.

BACKGROUND

Pressure washers are routinely used in wide variety of applications to remove debris, dirt, fluids and other substances from surfaces needed to be cleaned. For example, driveways, garage floors, concrete or tile patios, stairs, walkways, decks, home exteriors, fencing, cars and trucks, lawnmowers, dirt bikes, boats or trailers, outdoor furniture, and grills may benefit from being pressure washed. Commercial uses include factories, food processing plants or restaurants, agriculture equipment, construction equipment, earth moving equipment, and mining equipment, etc.

As can be imagined, it is sometimes desirable that the fluid being used to wash an item, such as water, water with chemicals or detergent added thereto, other chemical mixtures (e.g. bleach), etc, be heated to a certain temperature to help remove the undesirable substance that is clinging to a surface that needs to be cleaned. For example, some organic substances such as grease or fat are difficult to remove unless the temperature of the water used reaches a threshold emulsifying temperature. In some applications, it may be desirable that the water reach a certain temperature such as 120 degrees Celsius so that grease may be removed from a surface. Also, the cleaning fluid may be sprayed at a high pressure via a pump to help wash items.

Often, a pressure washer is supplied with a fossil fuel supply such as gasoline or diesel to fuel an engine, which powers a pump for expelling the water at the desired pressure. Also, the same fuel is often used as part of an ignition system that creates a flame that heats air that is blown through a heat exchanger, which in turn, heats the water and/or other cleaning fluids that are intended to clean a surface using the pressure washer. As can be imagined, the amount of fuel burned while maintaining a desired temperature of the cleaning fluid may vary considerably depending on the efficiency of the heat exchanger, the size of the heat exchanger, etc. If the heat exchanger operates inefficiently, or is oversized, then the profit of a business endeavor using the pressure washer can decrease significantly. Also, emissions to the atmosphere may be increased.

Furthermore, the amount of energy needed to be used for creating the pressurized cleaning needed for a particular application for a pressure washer may vary. As a result, it is preferable to have multiple pressure washer systems available that are well suited for various applications that the end user may need to address. Specifically, the amount of cleaning fluid, the size of the motor/engine, the size of the heat exchanger, the type of fuel used, the pump output, etc. may be chosen to suit any particular application.

Also, some applications may not require a tank for holding cleaning fluid as water may be permanently hooked up to the pressure washer. In other applications, the pressure washer may be desired to stay in the same place for a prolonged period of time, making the use of a skid mounted pressure washer desirable. In yet other applications, moving the pressure washer from one site to another may be needed or desirable, making a trailer mounted pressure washer desirable.

For all the above reasons, various configurations of pressure washer systems are needed. However, there exists a tradeoff between providing the desired versatility or variations on pressure washer systems and the cost of providing such systems. Increasing the number of available pressure washer systems may increase manufacturing cost because many different components such as various engines, fuel tanks, cleaning fluid tanks, pumps, etc. may be needed. So, the benefit to the user of using a pressure washer system tailored to a specific application, saving fuel etc., may be offset to at least a partial extent by the cost of providing that pressure washer system.

Accordingly, it is desirable to develop a design for a pressure washer system that maximizes the number of different available pressure washer systems suited for various applications while limiting the cost of manufacturing these different pressure washer systems.

SUMMARY OF THE DISCLOSURE

A modular design for a pressure washer system according to an embodiment of the present disclosure is provided. The modular design comprises a support frame including a top mounting surface, a first power assembly configured to be mounted to the support frame, and a cage assembly including a cage frame and a cage attached to the cage frame and configured to extend upwardly from the cage frame at least partially surrounding the power assembly, wherein the cage frame is configured to be attached to the support frame.

A method for providing or assembling a modular design for a pressure washer according to an embodiment of the present disclosure is provided comprising selecting a support frame, selecting a power assembly, and selecting a cage assembly.

A PEG unit according to an embodiment of the present disclosure is provided comprising a bottom attachment platform, a pump mounted on the bottom attachment platform, a pair of mounting ears disposed laterally on either side of the bottom attachment platform and spaced laterally away from the pump, the mounting ears also being disposed vertically above the bottom attachment platform and the pump, a generator operatively coupled to the bottom attachment platform and spaced vertically above the mounting ears, and an engine operatively coupled to the bottom attachment platform and spaced in a plane vertically above the mounting ears.

A blower and heat exchanger assembly for use with a pressure washer according to an embodiment of the present disclosure is provided including a support frame, the blower and heat exchanger assembly comprising a bottom attachment member, a heat exchanger subassembly disposed on top of the bottom attachment member, and a blower attached to the bottom attachment member in front of the heat exchanger subassembly, being in communication with the heat exchanger subassembly.

A cage assembly for use with a PEG unit and a blower and heat exchanger assembly according to an embodiment of the present disclosure is provided comprising a cage frame, a cage extending upwardly from the cage frame, at least one fuel tank attached to the cage frame, and a battery attached to the cage frame.

A tank assembly for use with a pressure washer including a support frame according to an embodiment of the present disclosure is provided, the tank assembly comprising a tank cage frame, a first cleaning fluid supply tank, and a tank cage attached to the frame extending therefrom and at least partially surrounding the first cleaning fluid supply tank.

DETAILED DESCRIPTION

Figure 1:
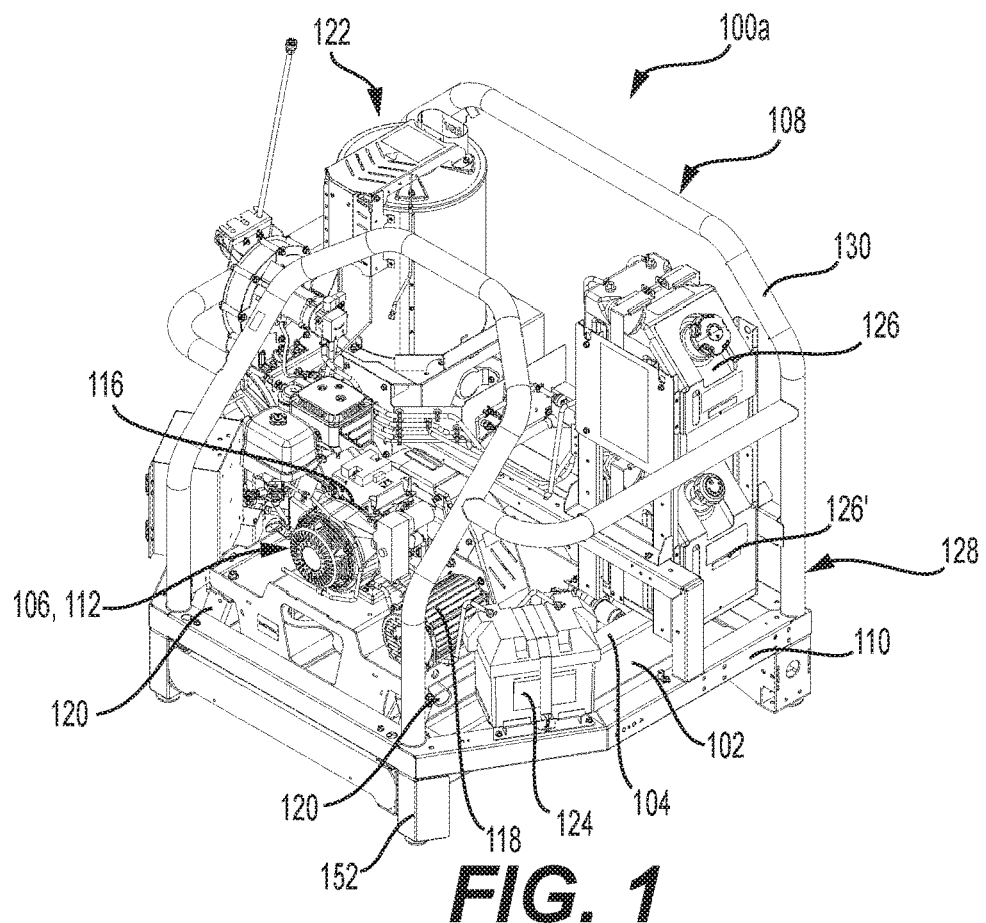
FIG. 1 is a perspective view of a skid mounted pressure washer utilizing a blower and heat exchanger assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A modular design for various pressure washer systems will now be described that helps to maximize the versatility of the configurations that pressure washers may take while also minimizing the number of components and assemblies used to assemble the pressure washer. This may reduce the cost of various configurations of a pressure washer system. Later, replacement modules or assemblies will be described. Finally, a method of providing and assembling modular designs for pressure washer systems will be discussed.

Looking at FIGS. 1 thru 4, various skid mounted pressure washers 100a, 100b, 100c, and 1004 are shown that are meant to stay in one place for a prolonged period of time to provide cleaning at a cleaning station or the like, Focusing on FIG. 1, it discloses a modular design for a pressure washer system, specifically a skid mounted pressure washer 100a, comprising a support frame 102 including a top mounting surface 104, a first power assembly 106 configured to be mounted to the support frame 102, and a cage assembly 108 (may also be referred to as a fuel and/or energy supply assembly since it often includes a battery 124 and fuel tanks 126, 132) including a cage frame 110 and a cage 130 is attached to the cage frame 110 and is configured to extend upwardly from the cage frame 110 and at least partially surround the first power assembly 106. The cage frame 110 is configured to be attached to the support frame 102 (will be discussed in more detail later herein with reference to FIG. 6). While FIG. 1 shows the skid mounted pressure washer 100a fully assembled, it is to be understood that the skid mounted pressure washer 100 may be shipped and then assembled on site with the aforementioned components and/or assemblies.

Various power assemblies may be provided that provide power to a pump 114 for creating the desired cleaning pressure of the cleaning fluid employed. The power may be supplied by any suitable method and apparatus including electrical motors, hydraulic or pneumatic motors, internal combustion engines, etc. For the embodiment shown in FIG. 1, the first power assembly 106 includes a PEG unit 112 including a pump 114 (best seen in FIGS. 5 and 10), an engine 116, and a generator 118. The engine 116 supplies mechanical power to the generator 118 that supplies electrical power to the pump 114. This apparatus and method of operation may be different for other embodiments. Though not clearly shown here in FIG. 1, the PEG unit 112 may include mounting ears 120 (may also be referred to as mounting flanges, best seen in FIGS. 5 and 10) spaced in a plane vertically above the pump 114 that are configured to allow the pump 114 to extend at least partially downwardly past the top mounting surface 104 of the support frame 102 (see FIG. 10). This may allow the cleaning fluid supplied to the pump 114 to remain at a positive pressure even when the cleaning fluid supply dwindles, helping to prevent cavitation that may damage the pump 114. In particular, the engine 116 may be a model no. HONDA GX390 engine delivering 13 horsepower and the pump 114 may be model no. GP TSS1511. The PEG unit 112 may be able to provide a flow rate of cleaning fluid of 4 gallons per minute at a pressure of up to 3000 psi. The temperature provided by the blower and heat exchanger assembly 122 may range up to 250 degrees F.

Since the skid mounted pressure washer 100a of FIG. 1 is intended to stay in one place, a cleaning fluid supply tank 204 is not supplied. Instead, a cleaning fluid such as water may be directly hooked up to the skid mounted pressure washer 100a. Other skid mounted pressure washers 100a may include a cleaning fluid supply tank 204 as will be discussed later herein with reference to FIG. 8. The cage assembly 108 further includes a battery 124 (for starting the engine 116) attached to the cage frame 110 and at least one small fuel tank 126 (for supplying fuel to the engine 116) attached to the cage frame 110. For this particular embodiment, two small fuel tanks 126 each having a capacity of 8 gallons are provided, one atop of another proximate the rear portion 128 of the cage frame 110 of the skid mounted pressure washer 100a. One small fuel tank 126 may supply fuel to the engine 116 and the other small fuel tank 126' to the combustion head of the heat exchanger subassembly as will be discussed. Or, both tanks may be connected in series to both the engine 116 and the combustion head.

This skid mounted pressure washer 100a may further comprise a first blower and heat exchanger assembly 122 configured to be attached to the support frame 102. The first blower and heat exchanger assembly 122 may be considered a "small" blower and heat exchanger assembly. Specifically, the height of the heat exchanger may be shorter than other blower and heat exchangers while having the same diameter as will be later described herein.

Figure 2:
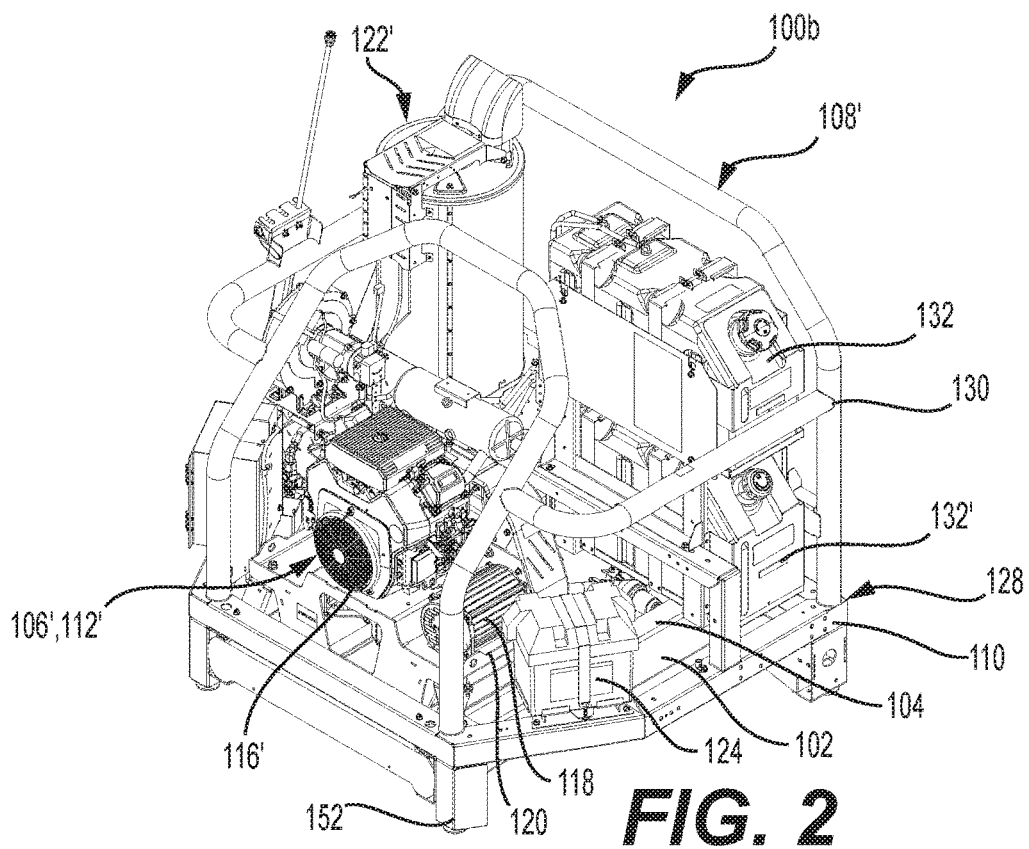
FIG. 2 is a perspective view of a skid mounted pressure washer utilizing a larger blower and heat exchanger assembly, a larger engine and larger fuel tanks as compared to the pressure washer of FIG. 1.

Turning now to FIG. 2, another skid mounted pressure washer 100b is shown, similar or nearly identical to the configuration of the skid mounted pressure washer 100a of FIG. 1 and being assembled in a similar manner, except for the following differences. A different engine 116', model no. Kohler ECH630 EFI is used that provides 19 HP. Also, a different pump (not clearly shown in FIG. 2), having model no. GP TSF1819 is employed as well as a second blower and heat exchanger assembly 122' that has more capacity or is "large" compared to the first blower and heat exchanger 122 of FIG. 1. More specifically, the second blower and heat exchanger 122' has a similar horizontal footprint and attachment structure, making it interchangeable with the first blower and heat exchanger 122, while the heat exchanger itself is taller than that of the first blower and heat exchanger 122 yet having the same diameter. Yet another difference is that large two large fuel tanks 132 each having 16 gallons of capacity are provided to power the more robust PEG unit 112'.

The result of these changes is that the skid mounted pressure washer 100b of FIG. 2 can deliver 5.5 gallons per minute of cleaning fluid at a pressure of up to 4000 psi at a temperature of up to 250 degrees F.

Figure 3:
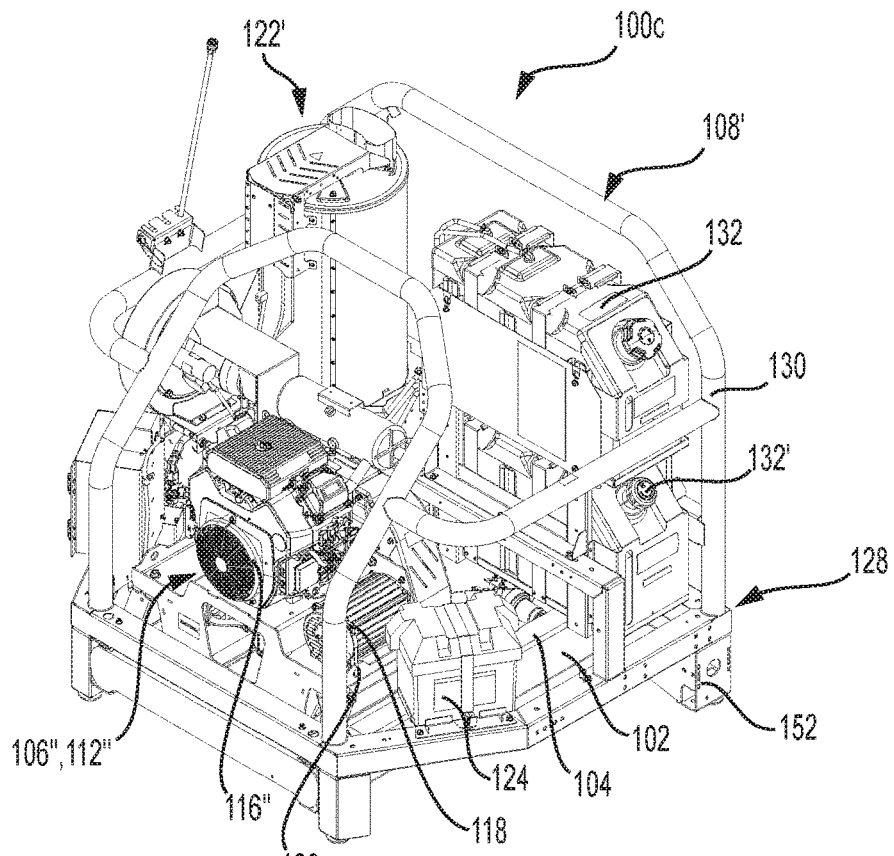
FIG. 3 is a perspective view of a skid mounted pressure washer similar to the skid mounted pressure washer of FIG. 2 except that a different engine with higher horsepower is provided.
Figure 4:
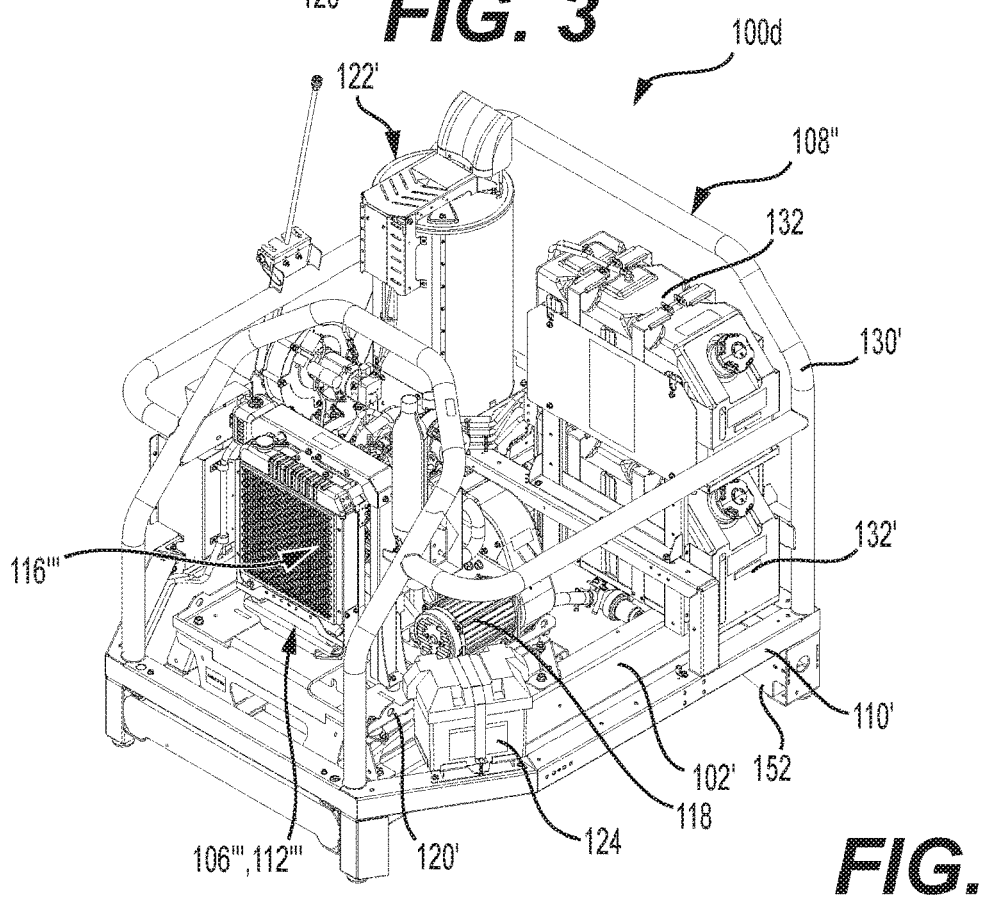
FIG. 4 is a perspective view of a skid mounted pressure washer similar to the skid mounted pressure washer of FIG. 2 except that a different engine with a higher horse power is used.

Referring now to FIG. 3, a skid mounted pressure washer 100c, similar or identical to that of FIG. 2 and being assembled in a similar manner, is shown except that a different engine 116" with higher horsepower is provided. More specifically, an engine 116" with model no, KUBOTA D902 with 21 horsepower may be provided. A similar flow rate of cleaning fluid of 5.5 gallons per minute at a pressure of up to 4000 psi at a temperature of up to 250 degrees F. may also be provided. While FIGS. 1, 2 and 4 are powered using gasoline fuel. FIG. 3 is powered using diesel fuel.

FIG. 4 illustrates a skid mounted pressure washer 100d. This skid mounted pressure washer 100d, is similar or identical to that of FIG. 2 and is assembled in like manner except that a different engine 116''' with a higher horsepower is used. More specifically, an engine 116''' with model no. Kohler ECH730 EFI delivering 26.5 horse power and a larger pump 114' having model no. GP TSF2219 are used. This PEG unit 112''' can deliver a flow rate of cleaning fluid at 8 gallons per minute at a pressure of up to 3000 psi and a temperature of up to 250 degrees C. The cage assembly 108" is also longer (approximately 14 inches in some embodiments) in FIG. 4 than the cages assemblies 108, 108' of FIGS. 1 thru 3, while maintaining the same width.

As mentioned previously herein, the second blower and heat exchanger assembly 122' is differently configured than the first blower and heat exchanger assembly 122 while also being configured to be attached to the same support frame 102, if desired. More particularly, the first blower and heat exchanger 122 defines a first horizontal mounting footprint 134 (best understood with reference to FIG. 7) and the second blower and heat exchanger 122' defines a second horizontal mounting footprint 134', and the first horizontal mounting footprint 134 and second horizontal footprint 134' are the same. In other words, the first blower and heat exchanger assembly 122 may be substituted for the second blower and heat exchanger assembly 122', and vice versa in some embodiments. In such embodiments, the respective mounting structures are also similar or interchangeable. So, substitute or replacement blower and heat exchanger assemblies 122, 122', 122" may be provided, mounted, and dismounted conveniently.

Similarly, various power assemblies including a first power assembly 106 and a second power assembly 106' that is differently configured than the first power assembly 106 (see FIGS. 1 and 2 for non-limiting examples) are provided that may also be configured to be attached to the same support frame 102 or similar support frames. Third power assembly 106" and fourth power assembly 106'" may also be provided that are differently configured from each other and the first power assembly 106 and the second power assembly 106'. In some embodiments, the first power assembly 106 includes a first mounting structure (such as ears 120) and the fourth power assembly 106'" includes a second mounting structure (such as ears 120') that is interchangeable with the first mounting structure or is similar thereto.

Figure 5:
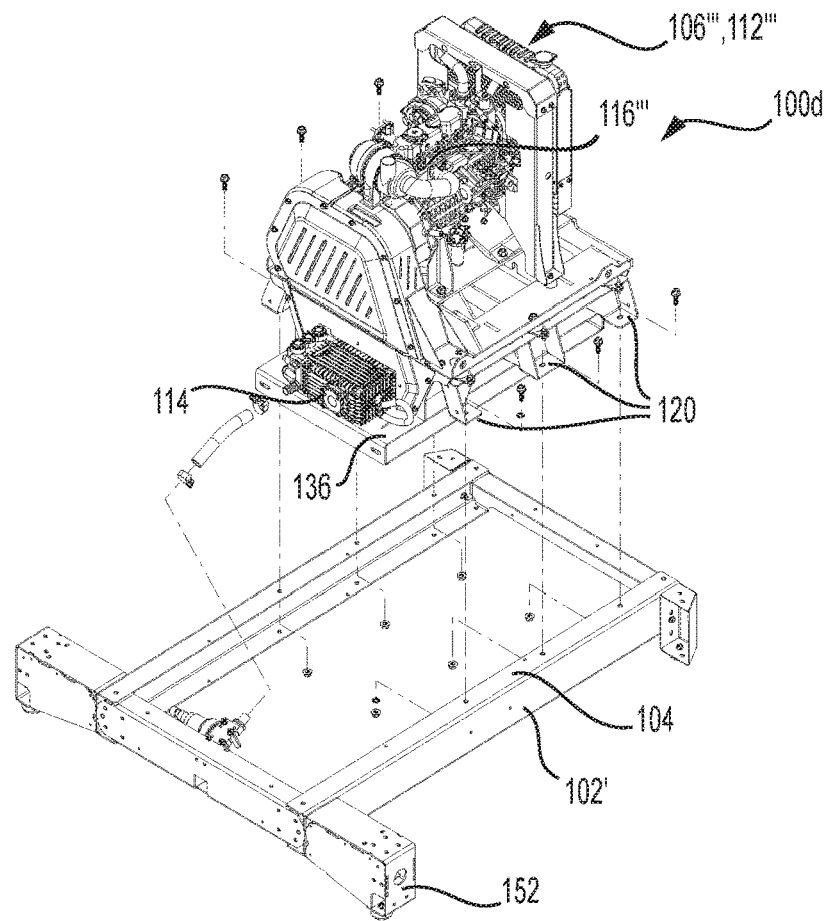
FIG. 5 is an exploded assembly view of the skid mounted pressure washer of FIG. 4, illustrating how the pump, engine and generator unit (PEG unit) is attached to the support frame of the skid mounted pressure washer of FIG. 4.

FIG. 5 is an exploded assembly view of the skid mounted pressure washer of FIG. 4 showing its PEG unit 112'" being attached to its support frame 102'. The PEG unit 112'" comprises a bottom attachment platform 136, a pump 114 mounted on the bottom attachment platform 136, a pair of mounting ears 120 disposed laterally (along the width of the support frame 102', only one pair is clearly shown in FIG. 5) on either side of the bottom attachment platform 136 and spaced laterally away (along the length of the support frame 102') from the pump 114, the mounting ears 120 also being disposed vertically in a plane above the bottom attachment platform 136 and the pump 114. A generator 118 (see FIG. 4) is operatively coupled to the bottom attachment platform 136 and spaced vertically in a plane above the mounting ears 120, and an engine 116'" is operatively coupled to the bottom attachment platform 136 and spaced vertically in a plane above the mounting ears 120 and is spaced laterally (along the length of the support frame 102) from the pump 114. Since the engine 116'" and generator 118 are spaced above the support frame 102', they may be easily serviced or replaced.

Figure 6:
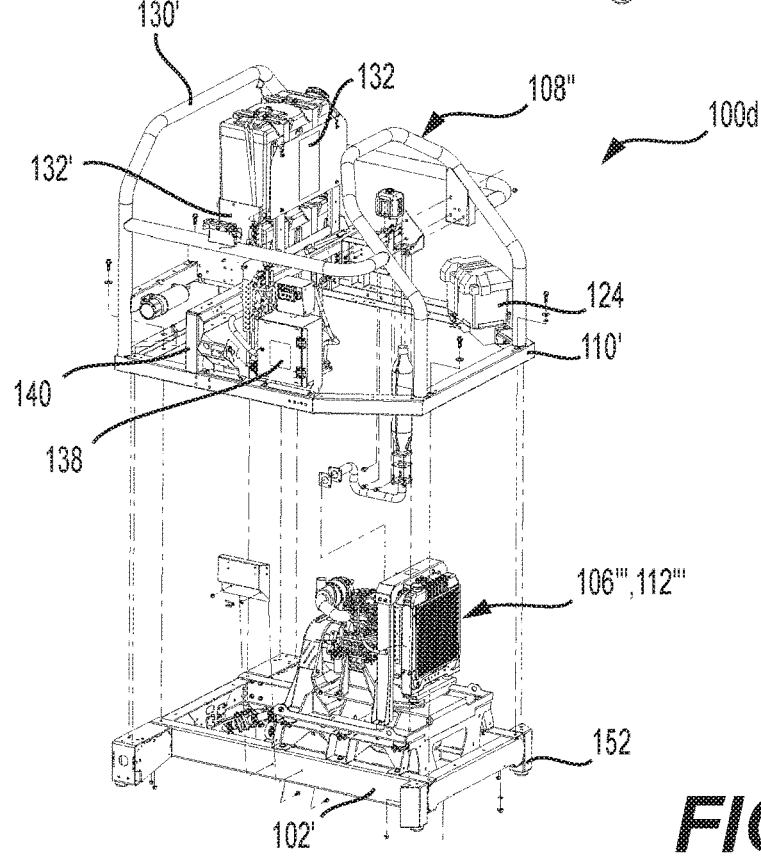
FIG. 6 illustrates the cage assembly with the battery and large fuel tanks being attached to the support frame of the skid mounted pressure washer of FIG. 5 after the PEG unit has already been attached to the support frame.

Looking at FIG. 6, a cage assembly 108" for use with a PEG unit 112" and a blower and heat exchanger assembly 122' (see FIG. 7) is shown be attached to the support frame 102 after the PEG unit 112'" has been attached to the support frame 102. The cage assembly 108" comprises a cage frame 110', a cage 130' extending upwardly from the cage frame 110', at least one fuel tank 132 attached to the cage frame 110, a control box 138, and a battery 124 attached to the cage frame 110". The cage frame 110" is configured to receive the PEG unit 112" and a blower and heat exchanger assembly 122' (see FIG. 7) within the cage 130' as will be discussed momentarily herein. A partition member 140 is provided that separates the fuel tanks 132 and the blower and heat exchanger assembly 122 from the PEG unit 112'".

Figure 7:
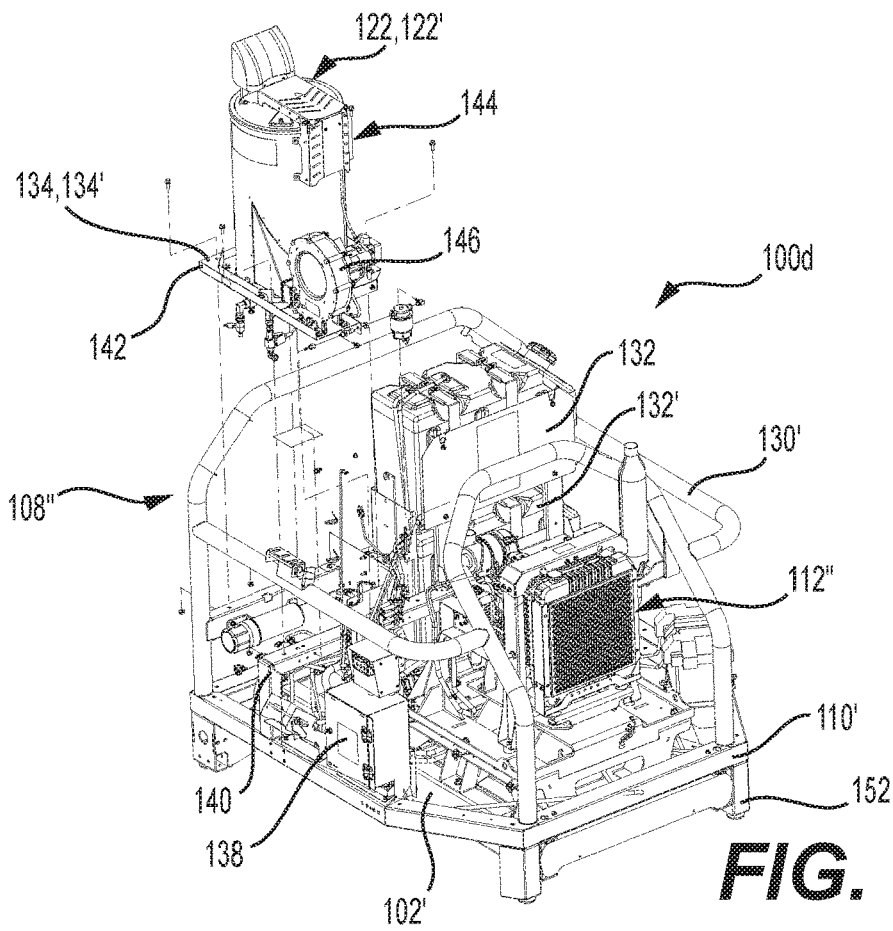
FIG. 7 depicts the assembly of a blower and heat exchanger assembly onto the cage frame of the skid mounted pressure washer of FIG. 6.

Referring now to FIG. 7, a blower and heat exchanger assembly 122 for use with the skid mounted pressure washer 100d including a support frame 102' (best seen in FIG. 6) is shown being attached to the support frame 102'. The blower and heat exchanger assembly 122' comprises a bottom attachment member 142 such as a flat sheet, a heat exchanger subassembly 144 disposed on top of the bottom attachment member 144, and a blower 146 attached to the bottom attachment member 142 in front of the heat exchanger subassembly 144. The blower is in fluid communication with the heat exchanger subassembly 144 for providing air to the subassembly. The bottom attachment member 142 is configured to be attached to the support frame 102' of the skid mounted pressure washer 100d.

Figure 8:
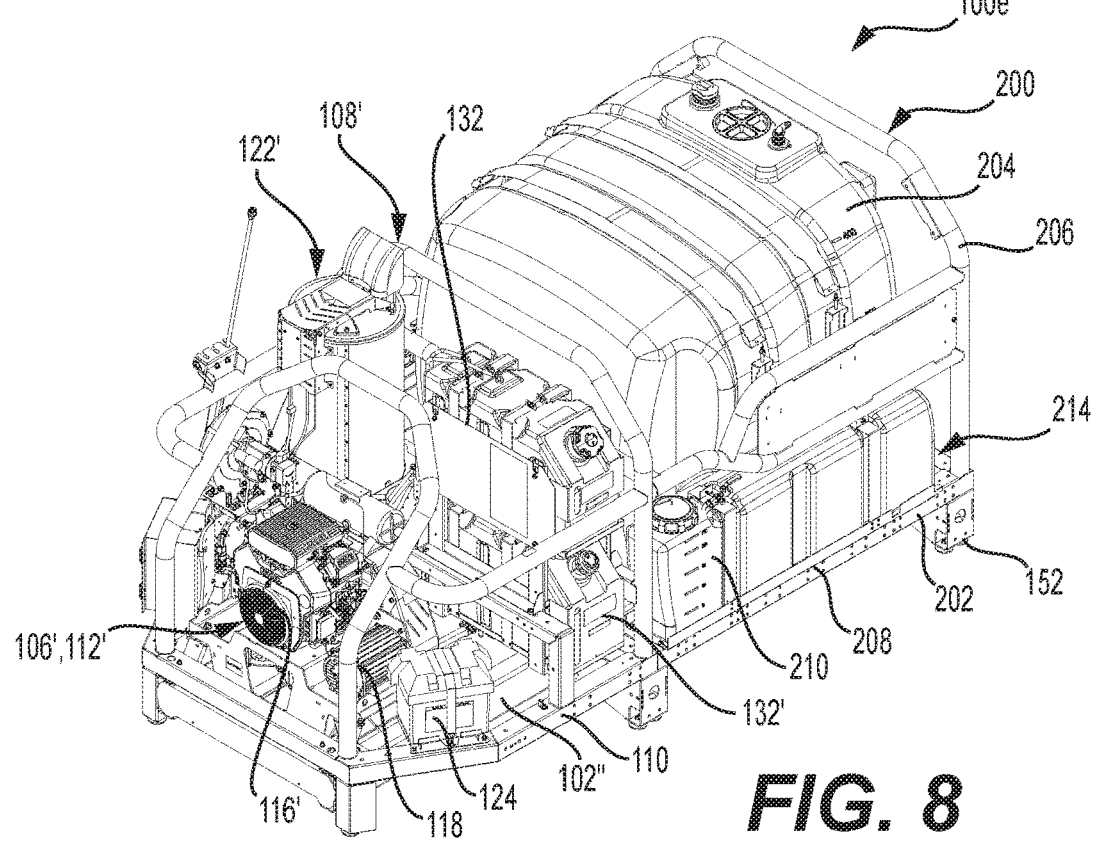
FIG. 8 is a perspective view of another embodiment of a skid mounted pressure washer that also has a tank assembly attached to its rear portion for supplying cleaning fluid with chemicals to the heat exchanger subassembly and to the pump.

In some embodiments, a skid mounted pressure washer 100e includes a tank assembly 200 as shown in FIG. 8. It should be noted that the front portion of the skid mounted pressure washer 100e is similarly or identically configured to skid mounted pressure washer 100b of FIG. 2. The tank assembly 200 may include a tank cage frame 202 that may be the same as the cage frame 110 or may be different than the cage frame 110 (as shown in FIG. 8). The tank assembly 200 may further comprise a first cleaning fluid supply tank 204, and a tank cage 206 attached to the tank cage frame 202 extending therefrom and at least partially surrounding the first cleaning fluid supply tank 204. The tank cage frame 202 may include first and second side portions 208, 208' (only side 208 is visible in FIG. 8) and at least one chemical tank 210 attached to the tank cage frame 202 being disposed laterally (along the width of the tank cage frame 202) on the side of the first cleaning fluid supply tank 204. The chemical tank 210 is intended to hold additives that do not make up the bulk of the final cleaning solution, which includes a cleaning fluid such as water. The additives may take the form of detergent, bleach, etc. So, the chemical tank 210 is in fluid communication with the first cleaning fluid supply tank 204. Chemical tanks may be omitted in other embodiments.

Figure 9:
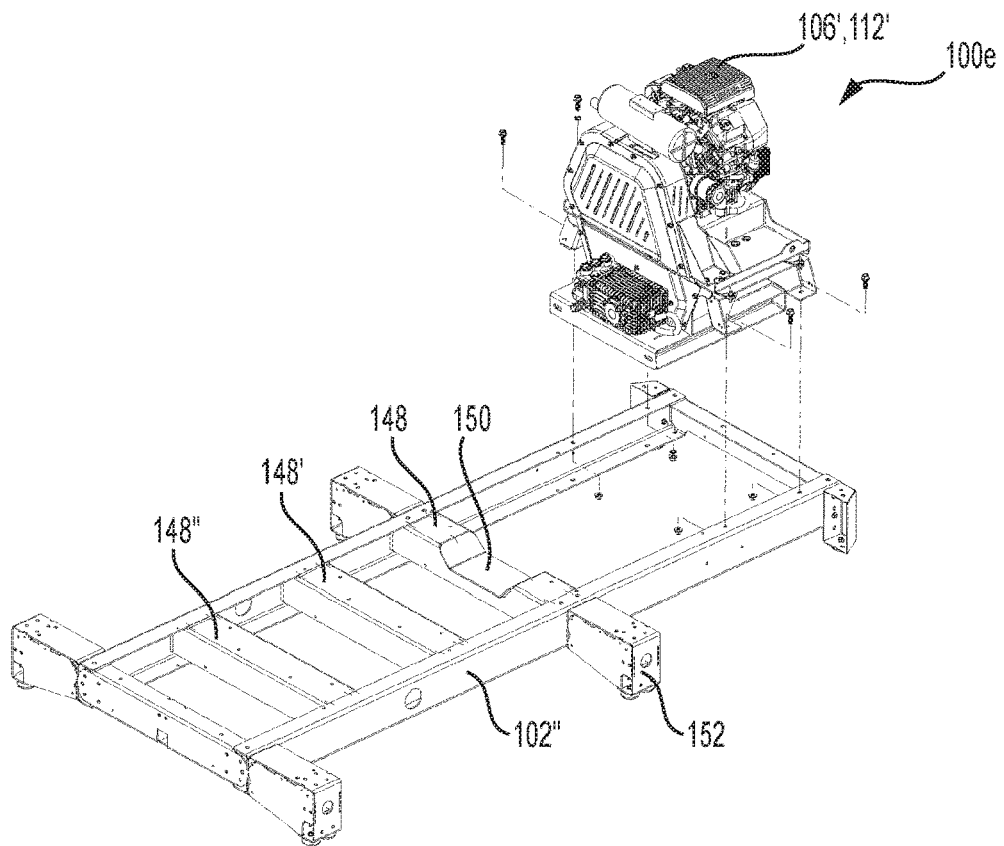
FIG. 9 is an exploded assembly view of the skid mounted pressure washer of FIG. 8, showing a PEG unit being attached to the support frame.
Figure 10:
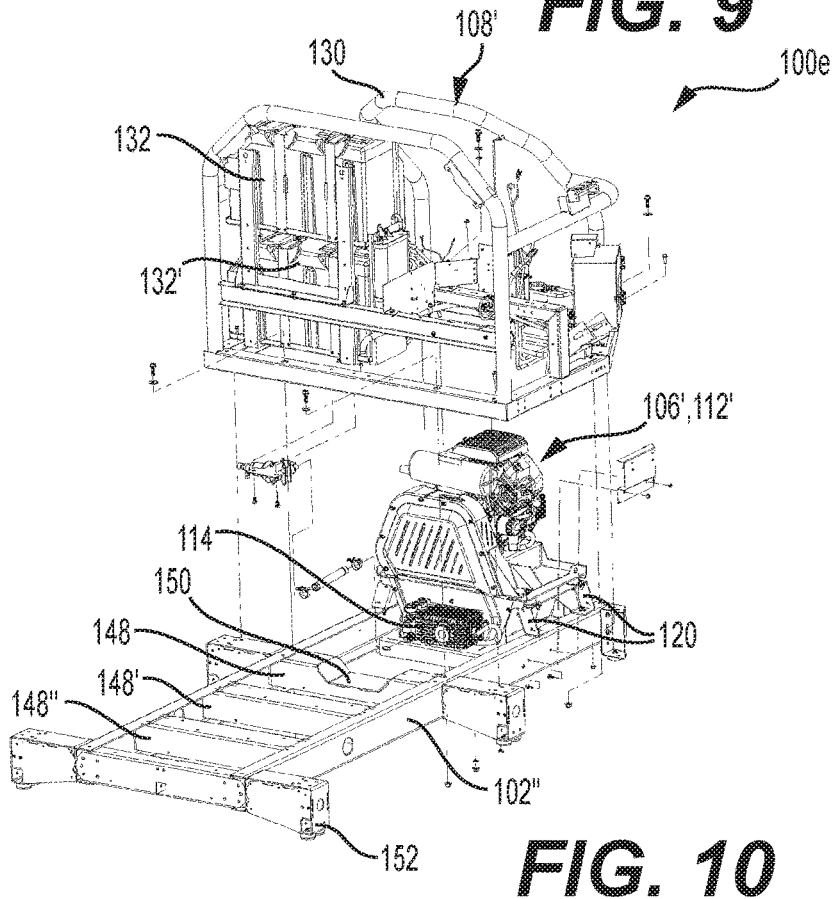
FIG. 10 illustrates the cage assembly with the fuel tanks being attached to the cage frame of the skid mounted pressure washer after the PEG unit has been attached to the support frame.

FIG. 9 illustrates the PEG unit 112' being attached to the support frame 102" of FIG. 8 while FIG. 10 shows the cage assembly 108' being attached to the support frame 102" after the PEG unit 112' has been attached to the support frame 102". A plurality of cross-members 148 are provided to support the cleaning fluid supply tank 204 or its associated tank assembly 200 and one of the cross-members 148 includes a notch 150 for allowing tubing to connect the pump 114 to the cleaning fluid supply tank 204 (see FIG. 8). The longer the cleaning fluid supply tank and its associated assembly are, the more cross-members are provided to provide sufficient support depending on the embodiment.

Figure 11:
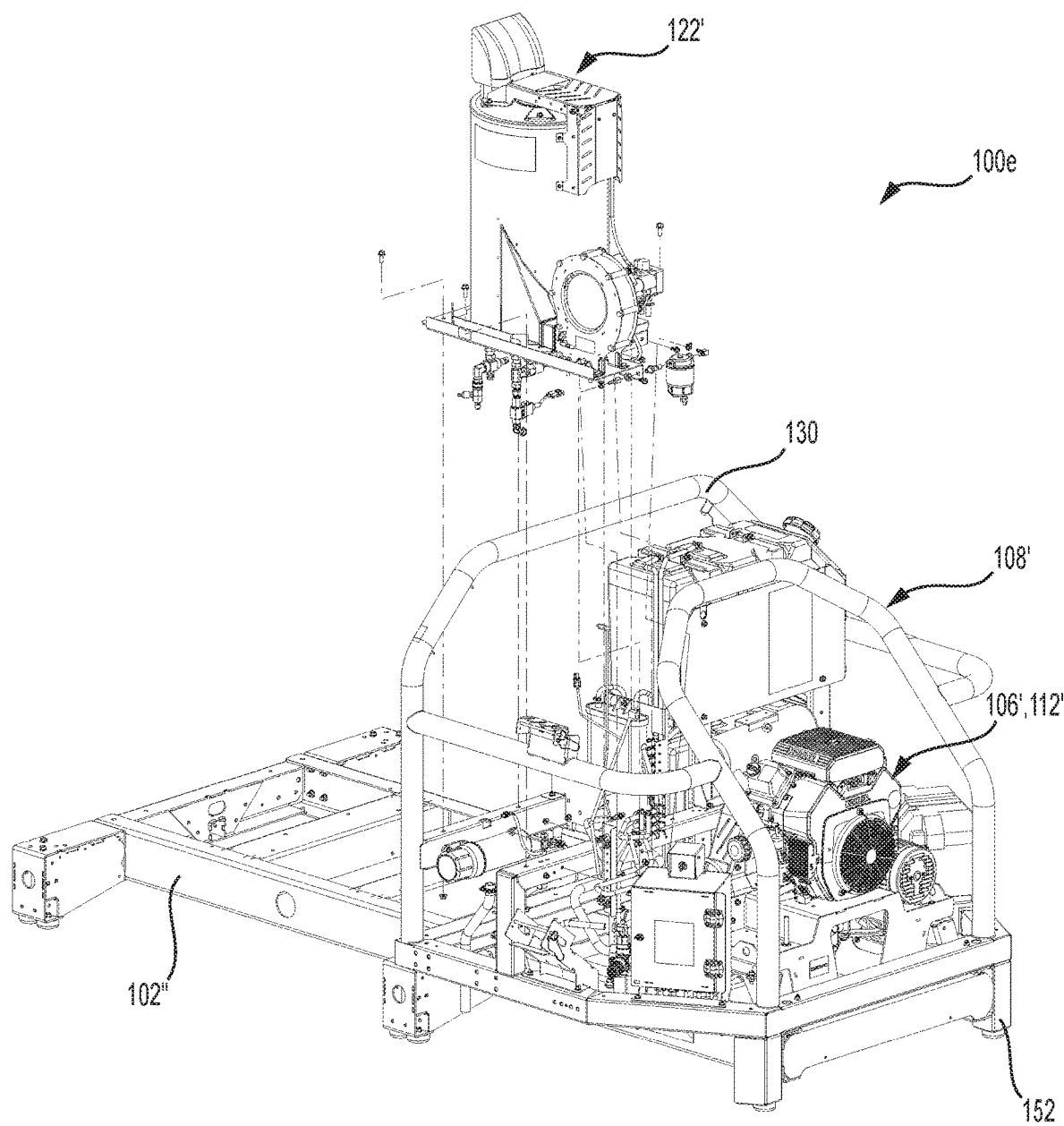
FIG. 11 illustrates a blower and heat exchanger assembly being attached to the cage frame of the skid mounted pressure washer of FIG. 10.
Figure 12:
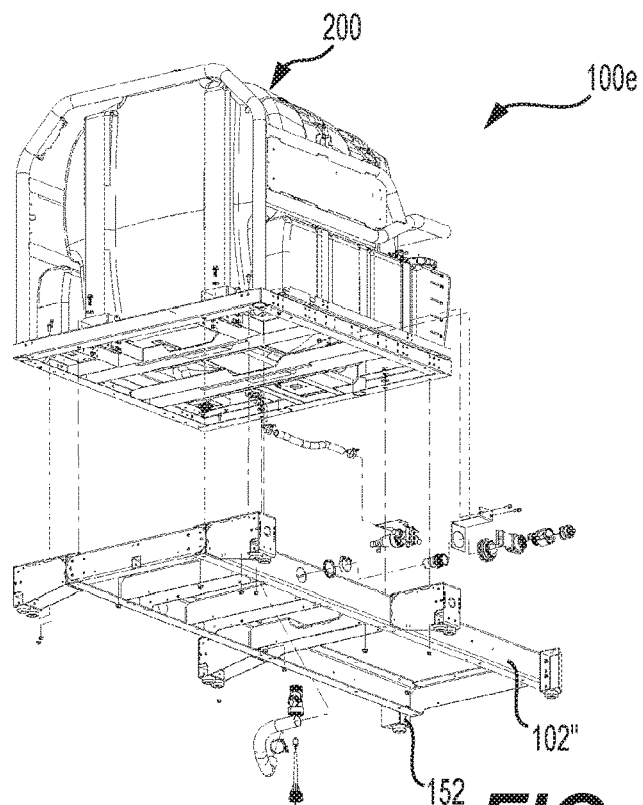
FIG. 12 is rear oriented perspective view showing the tank assembly with its associated tank cage frame and tank cage being attached to the support frame of the skid mounted pressure washer of FIG. 11.

FIG. 11 shows a blower and heat exchanger assembly 122' being attached to the support frame 102" within the cage 130 of the cage assembly 108'. FIG. 12 depicts a tank assembly 200 being assembled to the support frame 102". This assembly step may be accomplished before or after the steps shown in FIGS. 9 thru 11.

Figure 13:
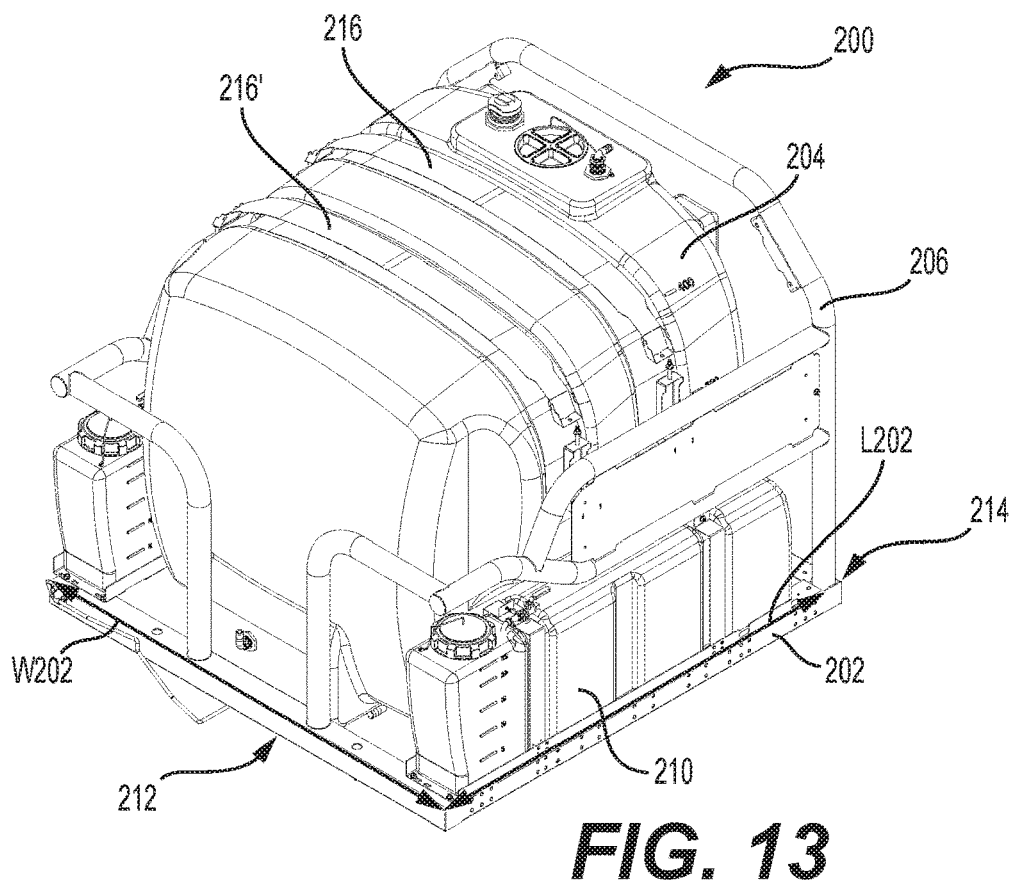
FIG. 13 is a perspective view of a tank assembly according to a first embodiment of the present disclosure.

FIG. 13 shows the tank assembly 200 of FIGS. 8 and 12 shown in isolation from a pressure washer system. It is to be understood that the tank assemblies 200 or tanks 204, 210 themselves may be provided as replacements or substitutes. As shown, the tank assembly 200 includes a first cleaning fluid supply tank 204, a tank cage frame 202 that includes a front portion 212 and a rear portion 214 and the tank cage 206 extends further vertically proximate the rear portion 214 of the tank cage frame 202 than the tank cage 206 extends vertically from the front portion 212 of the tank cage frame 202. Chemical tanks 210, meant to hold additives such as detergent or bleach, are provided on either side of the cleaning fluid supply tank 204. The first cleaning fluid supply tank 204 has a 400 gallon capacity and two strap slots 216. More or less strap slots 216 may be provided depending on the size of the tank.

Figure 14:
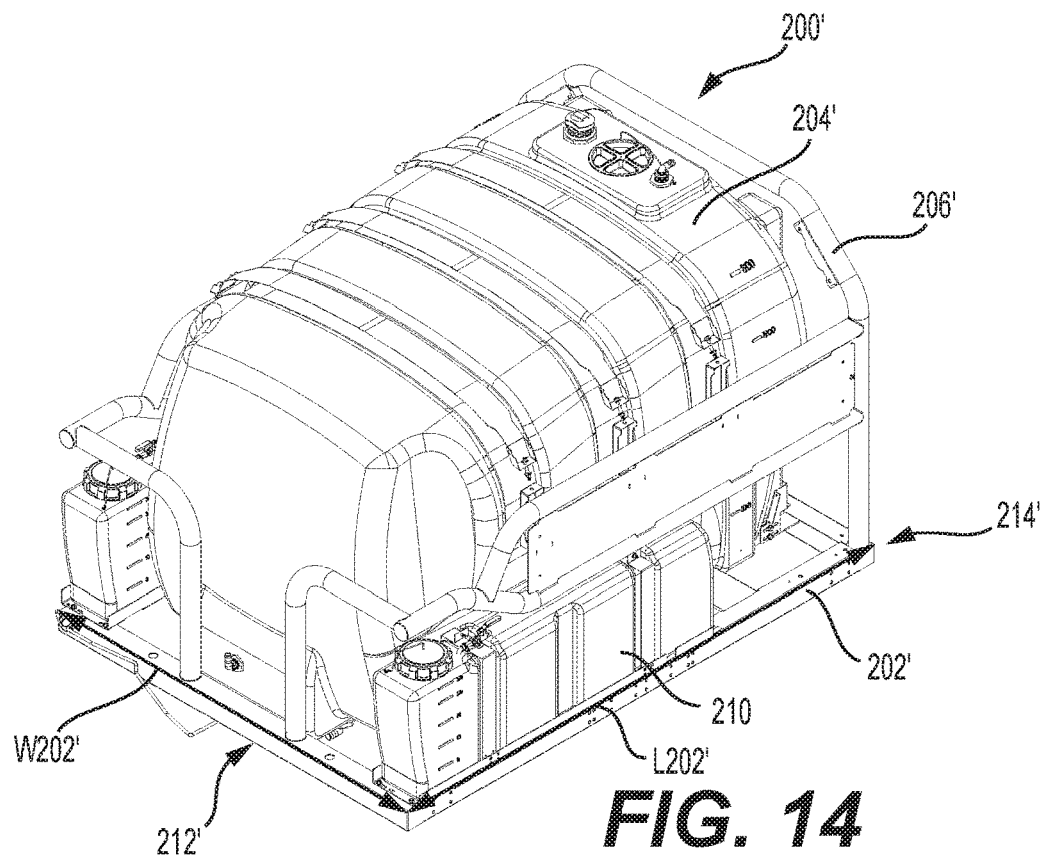
FIG. 14 is a perspective view of a tank assembly according to a second embodiment of the present disclosure.

FIG. 14 shows a second tank assembly 200' that is longer than that of FIG. 13 but is otherwise similarly constructed. This second tank assembly 200' has a capacity that is 600 gallons.

Figure 15:
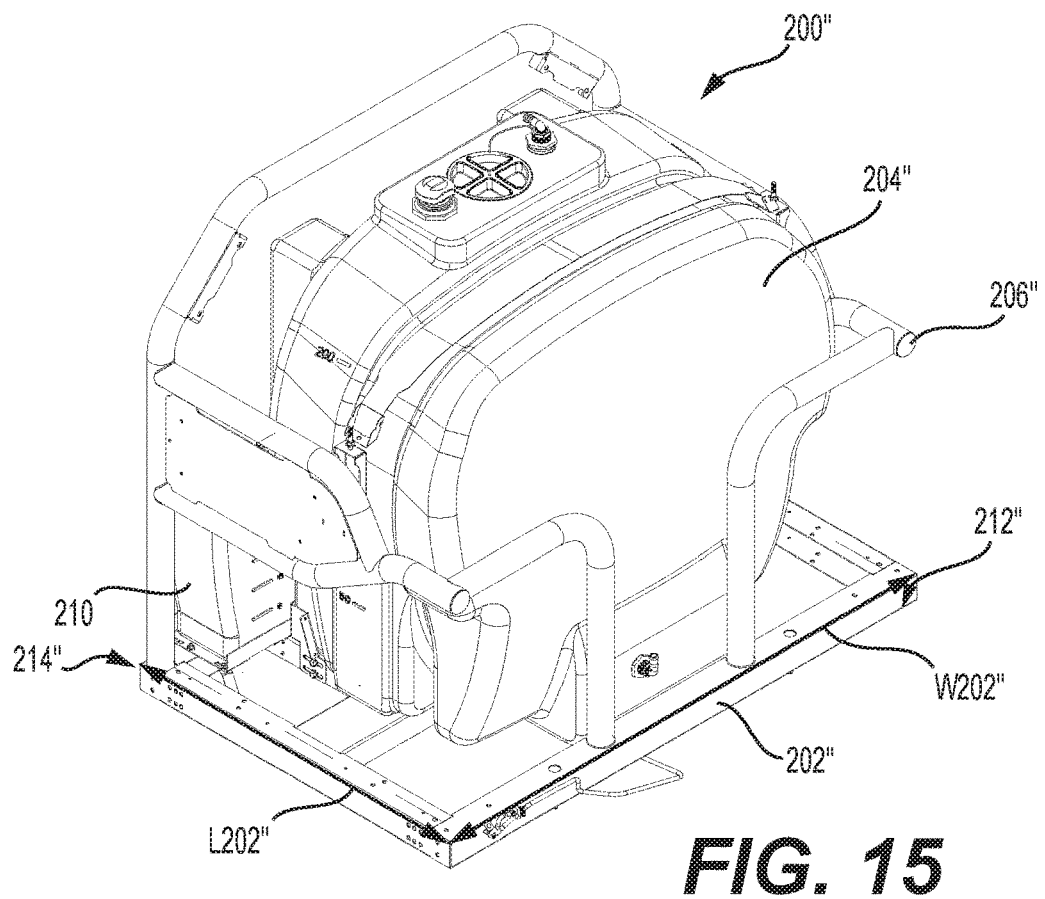
FIG. 15 is a perspective view of a tank assembly according to a third embodiment of the present disclosure.

FIG. 15 contains a third tank assembly 200" that is shorter than that of FIG. 13. The tank cage frame 202" of the third tank assembly 200" includes a front portion 212" and a rear portion 214" and further comprises at least one chemical tank 210 attached to the tank cage frame 202" being disposed proximate the rear portion 214" of the tank cage frame 202". The third cleaning fluid tank 204" has a capacity of 200 gallons.

Put into other words, the second tank assembly 200' may include a second cleaning fluid supply tank 204' that is differently configured than the first cleaning fluid supply tank 204. Likewise, the third tank assembly 200" may include a third cleaning fluid supply tank 204" that is differently configured than the first cleaning fluid supply tank 204.

In some embodiments, the first tank cage frame 202 defines a first width W202 and a first length L202, the second tank assembly 200' includes a second tank cage frame 202' that defines a second width W202' and a second length L202', and the third tank cage frame 202" defines a third width W202" and a third length L202", and the first width W202, second width W202' and third width W202" are the same while the first length L202 is different than the second length L202' and is also different than the third length L202".

With continued reference to FIGS. 13 thru 15, it is contemplated that the tank assembly 200, 200', 200" may be provided as a replacement assembly or substitute assembly. In such an embodiment, the tank assembly 200, 200', 200" may comprise a tank cage frame 202, 202', 202", a first cleaning fluid supply tank 204, 204', 204", and a tank cage 206, 206', 206" attached to the tank cage frame 202, 202', 202" extending therefrom and at least partially surrounding the cleaning fluid supply tank 204, 204', 204". The tank cage frame 202, 202', 202" may include first and second side portions 208, 208' and may further comprise at least one chemical tank 210 attached to the tank cage frame 202, 202' being disposed laterally on at least one side of the cleaning fluid supply tank 204, 202' or being disposed proximate the rear of the cleaning fluid supply tank 204".

The tank cage frame 202, 202', 202" may include a front portion 212, 212', 212" and a rear portion 214, 214', 214" and the tank cage 206, 206', 206" may extend further vertically proximate the rear portion 214, 214', 214" of the tank cage frame 202, 202', 202" than the tank cage 206, 206', 206" extends vertically from the front portion 212, 212', 212" of the tank cage frame 202, 202', 202".

For embodiments such as that shown in FIG. 15, the tank cage frame 202" includes a front portion 212" and a rear portion 214" and the tank assembly 200" further comprises at least one chemical tank 210 attached to the tank cage frame 202" being disposed proximate the rear portion 214" of the tank cage frame 202".

For the embodiments shown in FIGS. 1 thru 12, the support frame 102 is a skid frame with legs 152 that support or space the support frame 102 away from the ground. As will now be discussed more fully with respect to FIGS. 16 thru 24, the support frame 102 may be a trailer frame 302 (may also be referred to as a trailer chassis).

Figure 16:
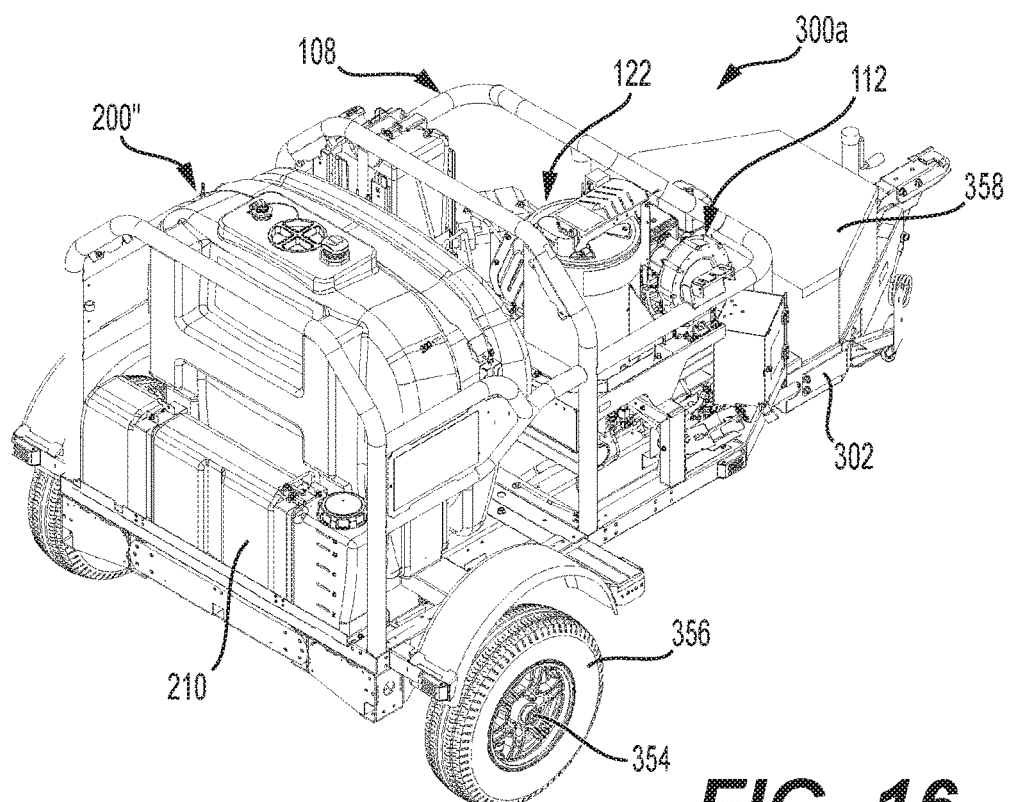
FIG. 16 is a rear oriented perspective view of a trailer mounted pressure washer according to a first embodiment of the present disclosure.

FIG. 16 is a rear oriented perspective view of a trailer mounted pressure washer 300a with a trailer frame 302 (support frame) that has a front portion similarly configured to the skid mounted pressure washer 100a of FIG. 1. That is to say, this trailer mounted pressure washer 300a has a similar or identical PEG unit 112, blower and heat exchanger assembly 122, and cage assembly 108. A tank assembly 200", similar or identical to that disclosed in FIG. 15 is attached to the rear portion 214 of the trailer frame 302. Since the weight of this trailer mounted pressure washer 300a is relatively low and its length is relatively short, the trailer frame 302 is also relatively short and only one axle 354 and one set of associated wheels 356 are provided. Though not shown, other options may be added to the trailer mounted pressure washer 300a including a rear bumper (not shown), hose reels (not shown) attached to the rear of the trailer mounted pressure washer 300a, a hose (not shown), a tool box 358, a sprayer (not shown), vacuum unit (not shown), water recovery unit (not shown) and ladder racks (not shown), etc. Similar features may be added to any of the trailer mounted pressure washers 300a, 300b, 300c, 300d discussed herein.

Figure 17:
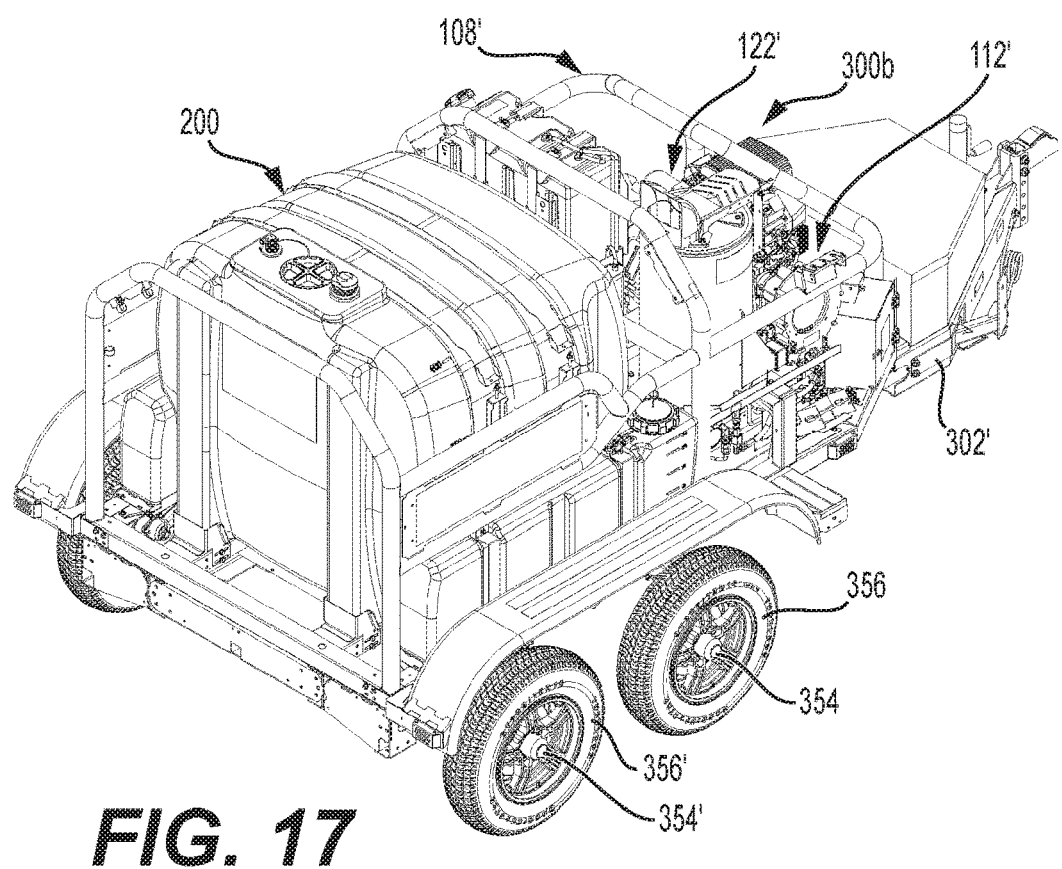
FIG. 17 is a perspective view of a trailer mounted pressure washer according to a second embodiment of the present disclosure.

Similarly, FIG. 17 is a rear oriented perspective view of another trailer mounted pressure washer 300b with a trailer frame 302' (support frame) that has a front portion 212 similarly configured to the skid mounted pressure washer 100b of FIG. 2. That is to say, this trailer mounted pressure washer 300b has a similar or identical PEG unit 112', blower and heat exchanger assembly 122', and cage assembly 108'. A tank assembly 200, similar or identical to that disclosed in FIG. 13 is attached to the rear portion 214 of the trailer frame 302'. Since the weight of this trailer mounted pressure washer 300b is at a medium value and its length is relatively longer, the trailer frame 302' is also longer and two axles 354, 354' and two sets of associated wheels 356, 356' are provided. A very similarly configured trailer mounted pressure washer 300c may be provided to that shown in FIG. 17 but instead includes the various assemblies and components of the skid mounted pressure washer 100c of FIG. 3.

Figure 18:
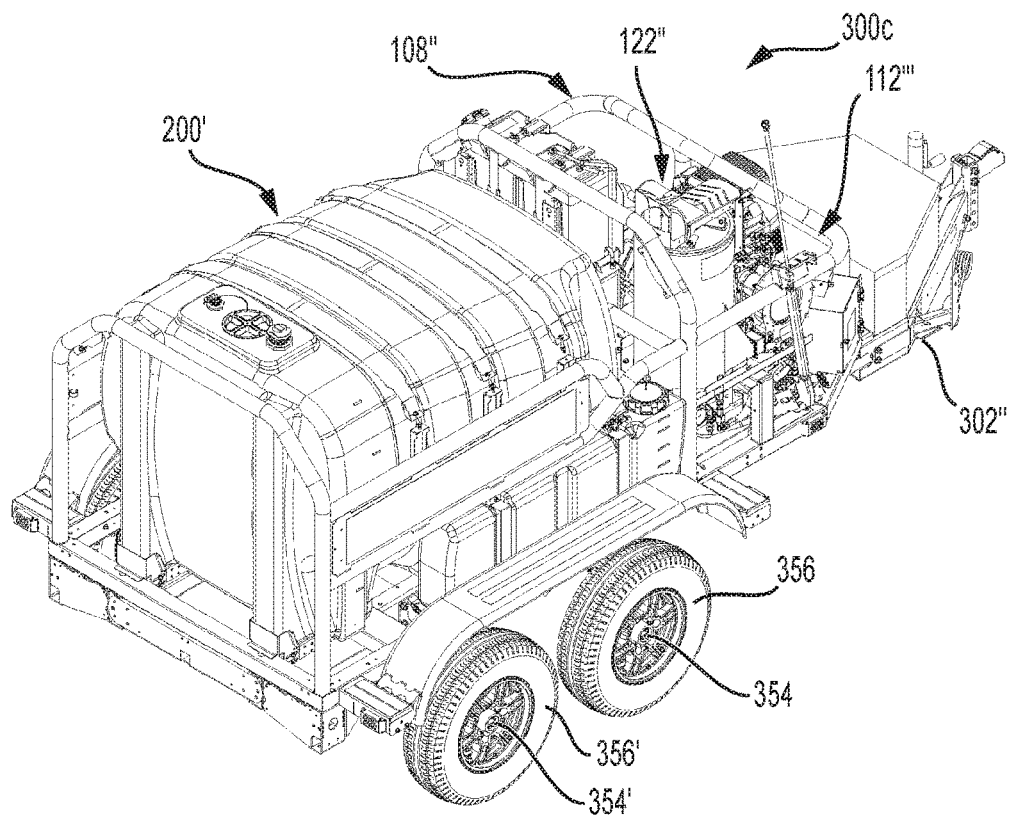
FIG. 18 is a perspective view of a trailer mounted pressure washer according to a third embodiment of the present disclosure.

FIG. 18 depicts a trailer mounted pressure washer 300c with a trailer frame 302" (support frame) that has a front portion similarly configured to the skid mounted pressure washer 100d of FIG. 4. That is to say, this trailer mounted pressure washer 300c has a similar or identical PEG unit 112''', blower and heat exchanger assembly 122', and cage assembly 108". A tank assembly 200', similar or identical to that disclosed in FIG. 14 is attached to the rear portion of the trailer frame 302". Since the weight of this trailer mounted pressure washer 300c is at a medium value and its length is relatively longer, the trailer frame 302" is also longer and two axles 354, 354' and two sets of associated wheels 356, 356' are provided.

Figure 19:
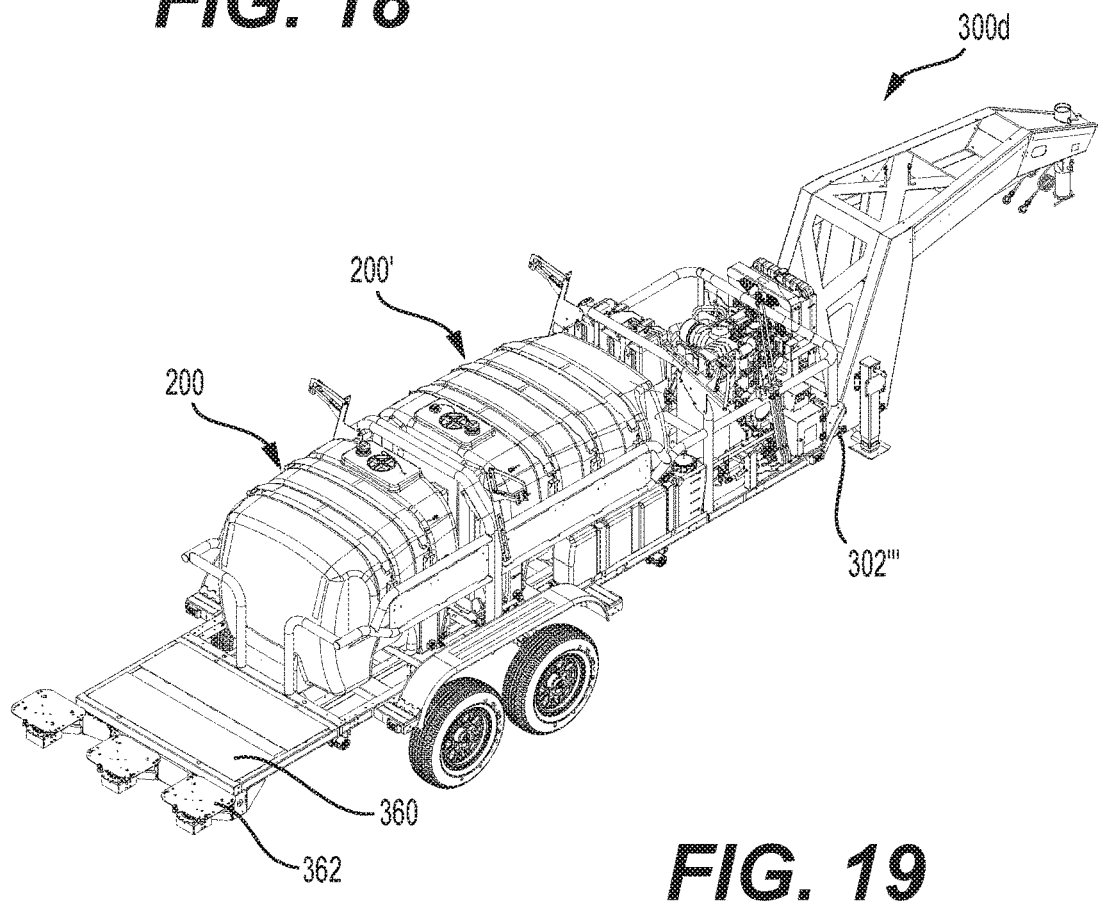
FIG. 19 is a perspective view of a trailer mounted pressure washer according to a fourth embodiment of the present disclosure.

Yet another trailer mounted pressure washer 300d is shown in FIG. 19 that is differently configured to that of FIG. 18 except that has the same PEG unit and blower and heat exchanger assembly 122". The trailer frame 302''' (support frame) is longer to provide for more cleaning fluid storage. More particularly, a first tank assembly 200' and a second tank assembly 200 are attached to the trailer frame 302''' side by side. More particularly, they are arranged back to back. A rear platform 360 as well as hose reel platforms 362, to which hose reels (not shown) may be attached is also shown.

Figure 20:
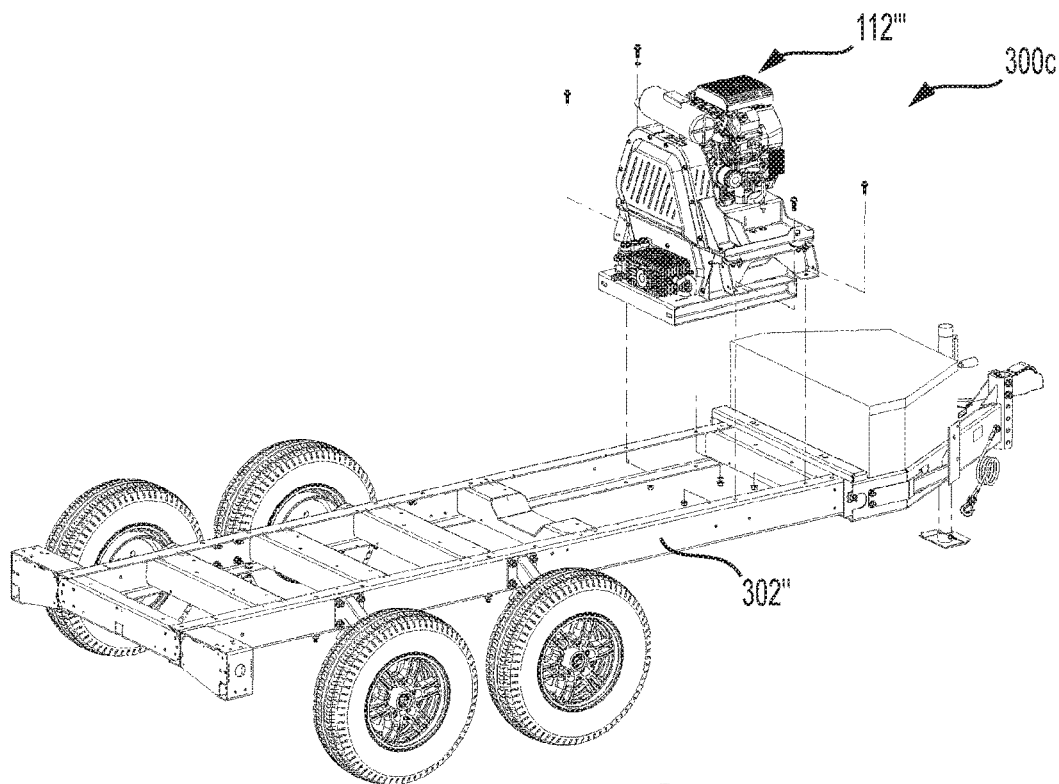
FIG. 20 is an exploded assembly view of the trailer mounted pressure washer of FIG. 18 showing the PEG unit being attached to the trailer frame of trailer mounted pressure washer.
Figure 21:
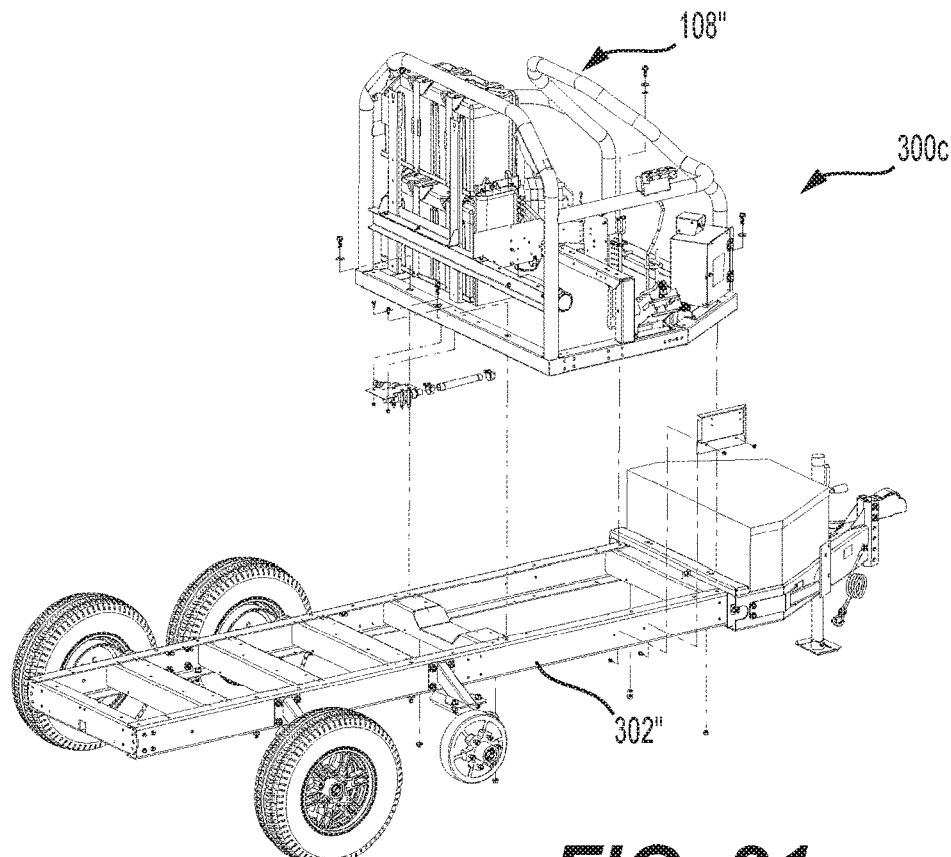
FIG. 21 is an exploded assembly view of the trailer mounted pressure washer of FIG. 20 showing the cage assembly with the generator and fuel tanks being attached to the trailer frame of the trailer mounted pressure washer.
Figure 22:
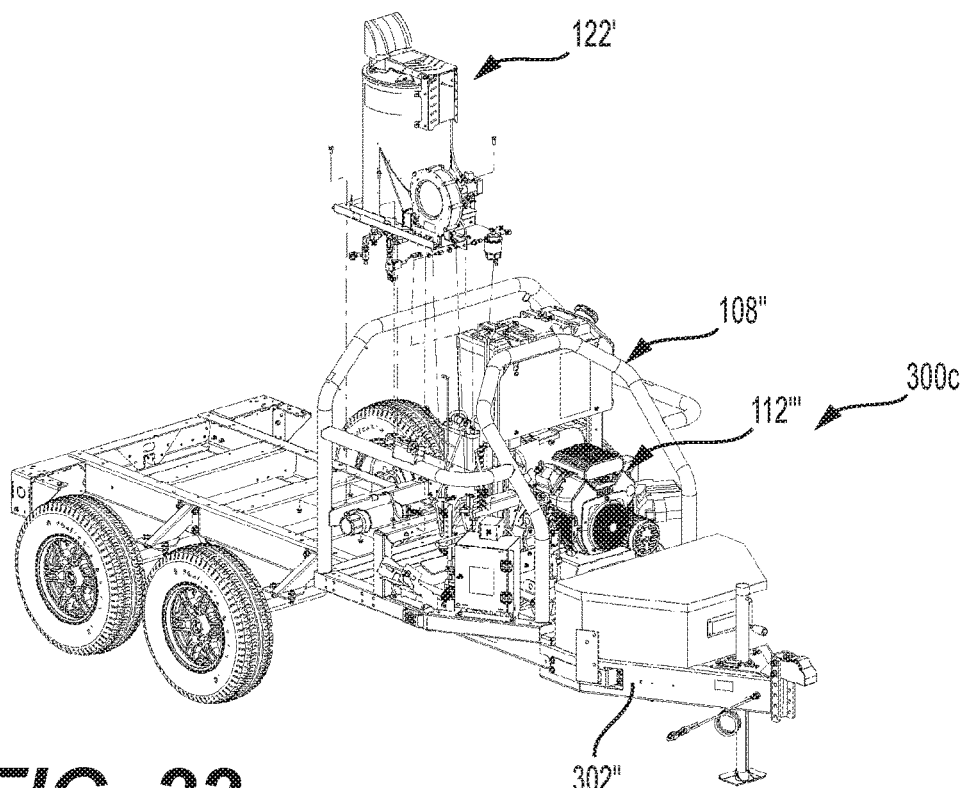
FIG. 22 is an exploded assembly view of the trailer mounted pressure washer of FIG. 21, illustrating the blower and heat exchanger assembly being attached to the cage frame of the trailer mounted pressure washer.
Figure 23:
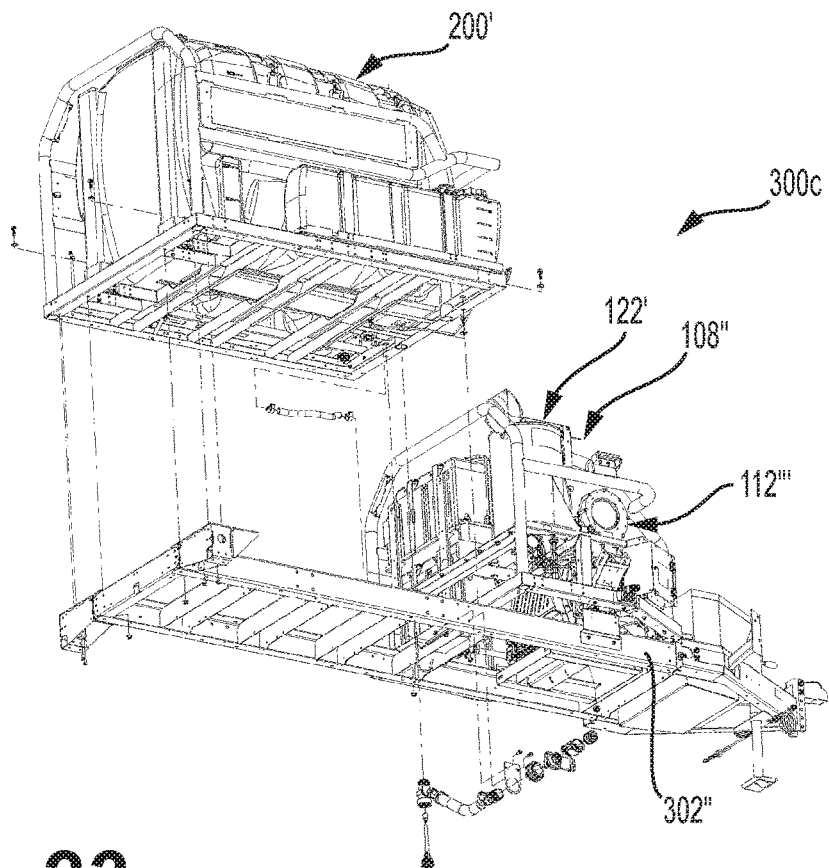
FIG. 23 is an exploded assembly view of the trailer mounted pressure washer of FIG. 22, showing the attachment of the tank assembly to the trailer frame after the blower and heat exchanger assembly has been attached to the cage frame and the PEG unit has been attached to the trailer frame.

FIG. 20 shows the PEG unit 112''' of the trailer mounted pressure washer 300c of FIG. 18 being assembled onto the trailer frame 302". FIG. 21 illustrates the cage assembly 108" being assembled onto the trailer frame 302", FIG. 22 shows the blower and heat exchanger assembly 122' being assembled onto the trailer frame 302". FIG. 23 shows the tank assembly 200' being assembled onto the trailer frame 302".

Figure 24:
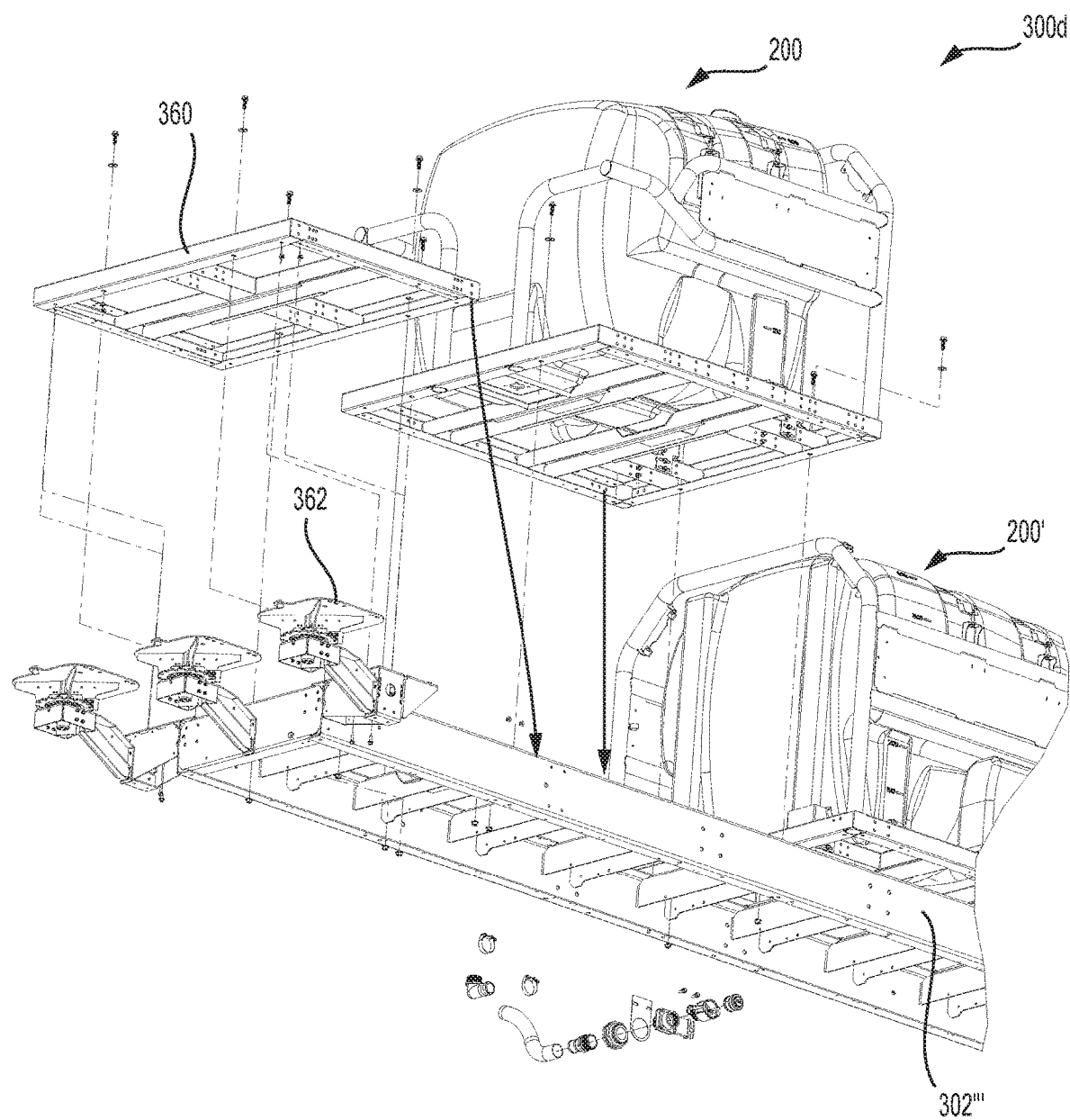
FIG. 24 illustrates how two different tank assemblies are assembled to the trailer frame of the trailer mounted pressure washer of FIG. 19. A rear platform assembly is also shown to be attached to the rear of the trailer frame. While not shown, hose reels may be mounted to the platform assembly or trailer frame.

FIG. 24 illustrates the tank assembly 200 and rear platform 360 being assembled onto the trailer frame 302''' of the trailer mounted pressure washer 300d of FIG. 19, While not shown, hose reels may be mounted to the rear platform 360 or trailer frame 302'''.

As can be seen, using four or fewer differently configured assemblies or subassemblies for each type of assembly or subassembly, such as PEG units, blower and heat exchanger assemblies, support frames, tank assemblies, cage assemblies, etc., many different pressure washer systems may be provided in manageable and cost effective manner. For example, at least ten different pressure washer systems may be provided using this limited number of subassemblies.

INDUSTRIAL APPLICABILITY

In practice, a skid mounted pressure washer, a trailer mounted pressure washer, a PEG unit, a blower and heat exchanger assembly, a support frame, a tank assembly, a cage assembly, etc. according to any embodiment described herein may be provided, sold, manufactured, and bought etc. or otherwise provided as needed or desired in an aftermarket or OEM (Original Equipment Manufacturer) context. It is to be understood that any of these embodiments may differently be sized and configured compared to any version specifically shown in the figures.

In particular, a PEG unit, a blower and heat exchanger assembly, a tank assembly, a cage assembly, etc. may be provided as a substitute or replacement for another PEG unit, another blower and heat exchanger assembly, a tank assembly, a cage assembly, etc. that is already in the field.

The various styles of pressure washers may be compatible with a host of operating environments and the portable pressure washers may be configured to be transported to the work site in a host of ways including those not specifically enumerated herein. In particular, various hitch styles may be provided for the trailer mounted pressure washers. It is contemplated that at least three different hitch styles may be provided depending on the size and/or weight of the trailer mounted pressure washer.

Figure 25:
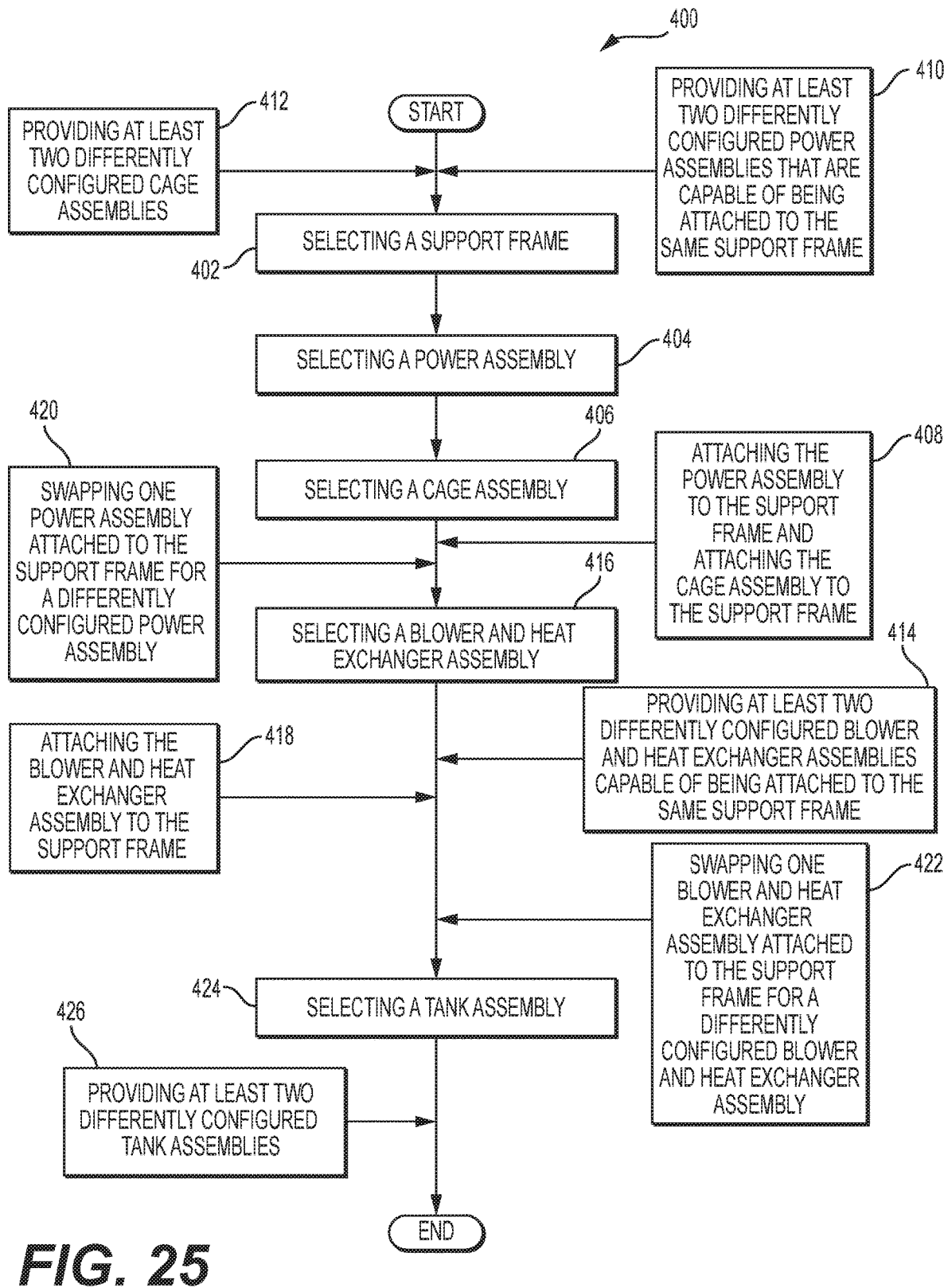
FIG. 25 is a flow chart illustrating a method for providing or assembling a modular design for a trailer mounted pressure washer.

A method for providing or assembling a modular design for a pressure washer is shown in FIG. 25. The method 400 may comprise selecting a support frame (step 402), selecting a power assembly (step 404), and selecting a cage assembly (step 406).

The method 400 may further comprise attaching the power assembly to the support frame and attaching the cage assembly to the support frame (step 408). The order of attaching the cage assembly and the power assembly to the support frame may be accomplished in any order.

The method 400 may further comprise providing at least two differently configured power assemblies that are capable of being attached to the same support frame (step 410). These differently configured power assemblies may be attached to different support frames in other embodiments.

Similarly, the method 400 may further comprise providing at least two differently configured cage assemblies (step 412). The differently configured cage assemblies may be attached to the same or differently configured support frames. In particular embodiments, the method 400 may further comprise providing at least two differently configured blower and heat exchanger assemblies capable of being attached to the same support frame (step 414).

The method 400 may further comprise selecting a blower and heat exchanger assembly (step 416) attaching the blower and heat exchanger assembly to the support frame (step 418). Differently configured blower and heat exchanger assemblies may be provided and may be attached to the same or differently configured support frames.

In some situations, it may be desirable when manufacturing the pressure washer or when upgrading the pressure washer in the field to change the structure and or functionality of the pressure washer. Thus, the method 400 may further comprise swapping one power assembly attached to the support frame for a differently configured power assembly (step 420) and/or swapping one blower and heat exchanger assembly attached to the support frame for a differently configured blower and heat exchanger assembly (step 422).

Likewise, the method 400 may further comprise selecting a tank assembly (step 424) and providing at least two differently configured tank assemblies (step 426). This may modification of a pressure washer to have as much or as little cleaning fluid storage as needed for a particular application. The tank assembly may later be attached to the support frame.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A modular design for a pressure washer system comprising:
   a support frame including a top mounting surface wherein the support frame comprises a pair of oppositely disposed lateral members defining a length of the support frame, a first cross member coupled between opposing front ends of the pair of longitudinal members, and a second cross member coupled between opposing back ends of the pair of longitudinal members, the first cross member being disposed oppositely from the second cross member, the pair of lateral members and first and second cross members being in planar alignment and forming a rectangular frame;
   a first power assembly configured to be mounted to the support frame, wherein the first power assembly includes a PEG unit including a pump, an engine, and a generator;
   the PEG unit further comprising a bottom attachment platform, and a pair of mounting ears on either side of the bottom attachment platform configured to attach the first power assembly to the top mounting surface of the support frame,
   wherein the pump is mounted on top of the bottom attachment platform,
   wherein the pair of mounting ears are spaced laterally away from the pump, the mounting ears also being disposed vertically in a plane above the bottom attachment platform and the pump, wherein the mounting ears are configured to allow the pump to extend at least partially downwardly past the top mounting surface of the support frame,
   wherein the engine of the PEG unit is operatively coupled to the bottom attachment platform and spaced vertically in a plane above the mounting ears and is further spaced laterally away from the pump; and
   a cage assembly including a cage frame and a cage attached to the cage frame and configured to extend upwardly from the cage frame and at least partially surround the first power assembly,
   wherein the cage frame is configured to be attached to the support frame,
   wherein the cage frame is in planar alignment with the support frame,
   wherein the first power assembly is replaceable with an alternately configured power assembly,
   wherein the cage assembly is replaceable by an alternately configured cage assembly, and
   wherein the support frame is configured to assemble with alternate configurations of a blower and heat exchange assembly, and/or a tank assembly.

2. The modular design for a pressure washer system of claim 1, wherein the generator of the PEG unit is operatively coupled to the bottom attachment platform and spaced vertically in a plane above the mounting ears.

3. The modular design for a pressure washer system of claim 1, wherein the cage assembly further includes a battery attached to the cage frame and at least one fuel tank attached to the cage frame.

4. The modular design for a pressure washer system of claim 1, further comprising a first blower and heat exchanger assembly configured to be attached to the support frame.

5. The modular design for a pressure washer system of claim 1, further comprising a first tank assembly including a first cleaning fluid supply tank, a first tank cage frame, and a first tank cage attached to the first tank cage frame and extending upwardly therefrom, at least partially surrounding the first cleaning fluid supply tank.

6. The modular design for a pressure washer system of claim 5, further comprising at least one chemical tank attached to the first tank cage frame.

7. The modular design for a pressure washer system of claim 5, further comprising a second tank assembly including a second cleaning fluid supply tank that is differently configured than the first cleaning fluid supply tank.

8. The modular design for a pressure washer system of claim 7, wherein the support frame is a trailer frame and the first tank assembly and the second tank assembly are attached to the trailer frame side by side.

9. The modular design for a pressure washer system of claim 1, wherein the support frame is a skid frame.

* * * * *